(12) United States Patent
Frenkler et al.

(10) Patent No.: US 6,302,035 B1
(45) Date of Patent: Oct. 16, 2001

(54) DESK

(75) Inventors: Fritz Frenkler, Hannover; Justus Kolberg, Hamburg, both of (DE); Eiichi Watabe, Osaka (JP)

(73) Assignee: Kokuyo Co., Ltd., Osaka (JP)

( * ) Notice: Subject to any disclaimer, the term of this patent is extended or adjusted under 35 U.S.C. 154(b) by 0 days.

(21) Appl. No.: 09/485,585
(22) PCT Filed: Jun. 14, 1999
(86) PCT No.: PCT/JP99/03171
  § 371 Date: Feb. 14, 2000
  § 102(e) Date: Feb. 14, 2000
(87) PCT Pub. No.: WO99/65362
  PCT Pub. Date: Dec. 23, 1999

(30) Foreign Application Priority Data

Jun. 16, 1998 (JP) .................................................. 10-168965
Oct. 15, 1998 (JP) .................................................. 10-294306

(51) Int. Cl.⁷ .................................................. A47B 11/00
(52) U.S. Cl. .................................................. 108/102; 312/196
(58) Field of Search .................................................. 108/98, 102, 158, 108/143, 50.01, 50.02, 188, 180; 312/195, 196, 194

(56) References Cited

U.S. PATENT DOCUMENTS

| 2,380,379 | * | 7/1945 | Attwood | 108/158 |
| 2,983,389 | * | 5/1961 | Trautmann | 108/102 |
| 4,974,913 | * | 12/1990 | Vogt et al. | 108/143 |
| 5,259,305 | * | 11/1993 | Korb | 108/129 |
| 5,974,985 | * | 11/1999 | Flototto | 108/50.01 |

FOREIGN PATENT DOCUMENTS

| 0413904 A | * | 2/1991 | (EP) | 312/196 |
| 36-9439 | | 4/1961 | (JP) . | |
| 3-140108 | | 6/1991 | (JP) . | |

* cited by examiner

Primary Examiner—Peter M. Cuomo
Assistant Examiner—Jerry A. Anderson
(74) Attorney, Agent, or Firm—Banner & Witcoff, Ltd.

(57) ABSTRACT

In order to provide a desk in which a component can be commonly used for top plates of various different specifications, the desk is so constructed that a frame 2 which supports a top plate 3 comprises a plurality of frame members 21, 22, 23 and at least a part of the frame members 21, 22, 23 are provided with rail grooves 21a, 22a, 23a as a longitudinally continuous mounting portion and a certain position of the rail grooves 21a, 22a, 23a is selected, and a mounting member 4 through 7 for mounting a component such as optional components or a top plate 3 can be held at the position.

11 Claims, 34 Drawing Sheets

DESK

FIELD OF THE ART

This invention relates to a desk and, more particularly, to a desk which is preferably used in offices or at home.

BACKGROUND ART

Conventionally desks in the market are substantially standardized for the convenience of both manufacturers and users. Although the desks are standardized, a plurality of different standards exist or the standard varies in countries. This becomes an obstacle to unification of a manufacturing line of the desks. In addition to this situation, office machines placed on a top plate of a desk have remarkably been increased due to a rapid progress of office automation. A top plates has generally been rectangular, however, top plates having a variety of shapes come into appearance recently so as to cooperate with recent office automation. Further, an odd-shaped top plate to connect top plates of adjoining desks may be required to improve mobility of an office or to fulfill environment of an office. As described above, a specification of a desk to be manufactured is expected to become more and more diversified in the future.

In a frame which supports a top plate, a suitable position at which the top plate is supported differs according to a specification of the top plate. For an optional component such as a shelf, an electrical outlet or a telephone stand, a position on which the component is mounted or an arrangement of mounting the component varies in accordance with a specification of the top plate. In view of the above situation, the frame supporting the top plate has been designed and manufactured one by one to satisfy a demand. However, in the above-described top plate, if the frame is manufactured as conventionally, productivity is getting worse and worse and handling in packing or distribution is getting troublesome.

DISCLOSURE OF THE INVENTION

In order to solve the above problems the invention is to provide a desk in which a frame can be commonly used for mounting top plates of various different specifications or various optional components.

The desk of the invention is so arranged that a frame which supports a top plate comprises a plurality of frame members, at least a part of the frame members are provided with a longitudinally continuous mounting portion, a certain position on the mounting portion is selected, and a mounting member for mounting a component such as optional components or a top plate can be held at the position.

A mounting portion may be so formed that a rail groove is made to open continuously at an upright wall of the frame, in which case a base end of the mounting member can make an engagement with the rail groove.

In this case a mounting member may comprise a bracket having a mounting face, a liner member which is arranged at a base end of the bracket and a screw which is helically connected with the liner member after passing through the bracket, in which case the mounting member can be fixed by steps of arranging the base end of the bracket affixed to an outer face of the upright wall, arranging the liner member affixed to an inner face of the upright wall in the rail groove, and with this condition kept, helically connecting the screw which has passed through the bracket with the liner member so that the upright wall can be held between the bracket and the liner member.

For making it easy to insert the liner member into the rail groove, it is preferable that the liner member can make an abutting contact with a position which extends over the inner faces of the upright walls after passing over the rail groove by steps of passing through an opening of the rail groove then being rotated at a predetermined angle.

For mounting an optional component such as a telephone stand or a PC stand which is arranged over a top plate suitably, it is preferable that a space is formed between the top plate and the frame, and a part of the mounting member can be extended to a position near an edge of the top plate at which the optional component is mounted.

For mounting an optional component such as an electrical outlet which is arranged under a top plate suitably, it is preferable that a pair of mounting members are provided, and the optional component can be held between the mounting members.

A frame may comprise right and left side frame members, a front frame member which connects front ends of each side frame members and a reinforcing frame member which connects centers of each right and left side frame members and at least the side frame members wherein the front frame member are made of a material extruded to have an isometric cross-section and a rail groove is made to open inwardly at an upright wall.

In this case it is preferable that a rail groove is made to open at an upright wall of both sides of the reinforcing frame member.

It is especially preferable that both ends of the reinforcing frame member can make an engagement with the corresponding rail groove of the side frame members so as to be mounted thereon.

As mentioned above, the desk of the invention is so arranged that at least a part of the frame members are provided with the longitudinally continuous mounting portion, the certain position of the mounting portion is selected, and the mounting member to mount a component such as optional components or a top plate can be held at the position.

In accordance with the arrangement, in case a position at which the top plate is supported or a position on which an optional component is mounted is diversified because of variance of a specification of a top plate according to a standard, or appearance of an odd-shaped top plate which does not meet a conventional standard, a possibility to deal with this case will be improved if a position on which the mounting member is mounted can be selected optionally from the longitudinally continuous mounting portion of the frame, and the mounting member for mounting a component such as optional components or a top plate can be held at the position. As a result, productivity will be improved by far compared with a case that the frame is designed and manufactured one by one to meet a specification of a top plate.

In addition to the arrangement, if the mounting portion is so formed that a rail groove is made to open continuously at an upright wall of the frame, and a base end of the mounting member can make an engagement with the rail groove, the mounting portion can be formed with ease by means of extrusion of the frame and a mounting condition of the mounting member can be made extremely stable.

If the mounting member comprises a bracket, a liner member and a screw, and can be fixed by steps of arranging the base end of the bracket affixed to an outer face of the upright wall, arranging the liner member affixed to an inner face of the upright wall in the rail groove, and with this condition kept, helically connecting the screw which has passed through the bracket with the liner member, the mounting member can be mounted or dismounted with ease and a position on which the mounting members are mounted can be selected optionally.

Further, if the liner member is so arranged that it can make an abutting contact with a position which extends over the inner faces of the standing walls after passing over the rail groove by steps of passing through an opening of the rail groove then being rotated at a predetermined angle, it becomes easy to insert the liner member into the rail groove.

If a space is formed between the top plate and the frame so that a part of the mounting member can be extended to a position near an edge of the top plate, a stand such as a telephone stand or a PC stand and an auxiliary top plate can be mounted over or near the top plate easily with the frame used as a foothold.

Further, if a pair of mounting members are mounted, an optional component such as an electrical outlet can be held between the mounting members with ease even though the position at which the optional component is mounted locates under the top plate. Further, it is possible for the mounting members to mount an optional component of various sizes.

In addition, if the frame comprises side frame members, a front frame member and a reinforcing frame member wherein a rail groove is formed for each of the frame members, it is possible to improve productivity because these frame members can be manufactured to have an isometric or generally isometric cross-section by means of extrusion and it is also possible to increase by far the degree of freedom in selecting a portion for mounting the mounting members.

In addition, if both ends of the reinforcing frame member can make an engagement with the rail groove so as to be mounted thereon, there is no need of other complicated mounting arrangement and it becomes relatively easy to change the position at which the reinforcing frame member is mounted.

BEST MODES OF EMBODYING THE INVENTION

The invention will be described in detail with reference to an embodiment thereof shown in the accompanying drawings.

Figure 1:
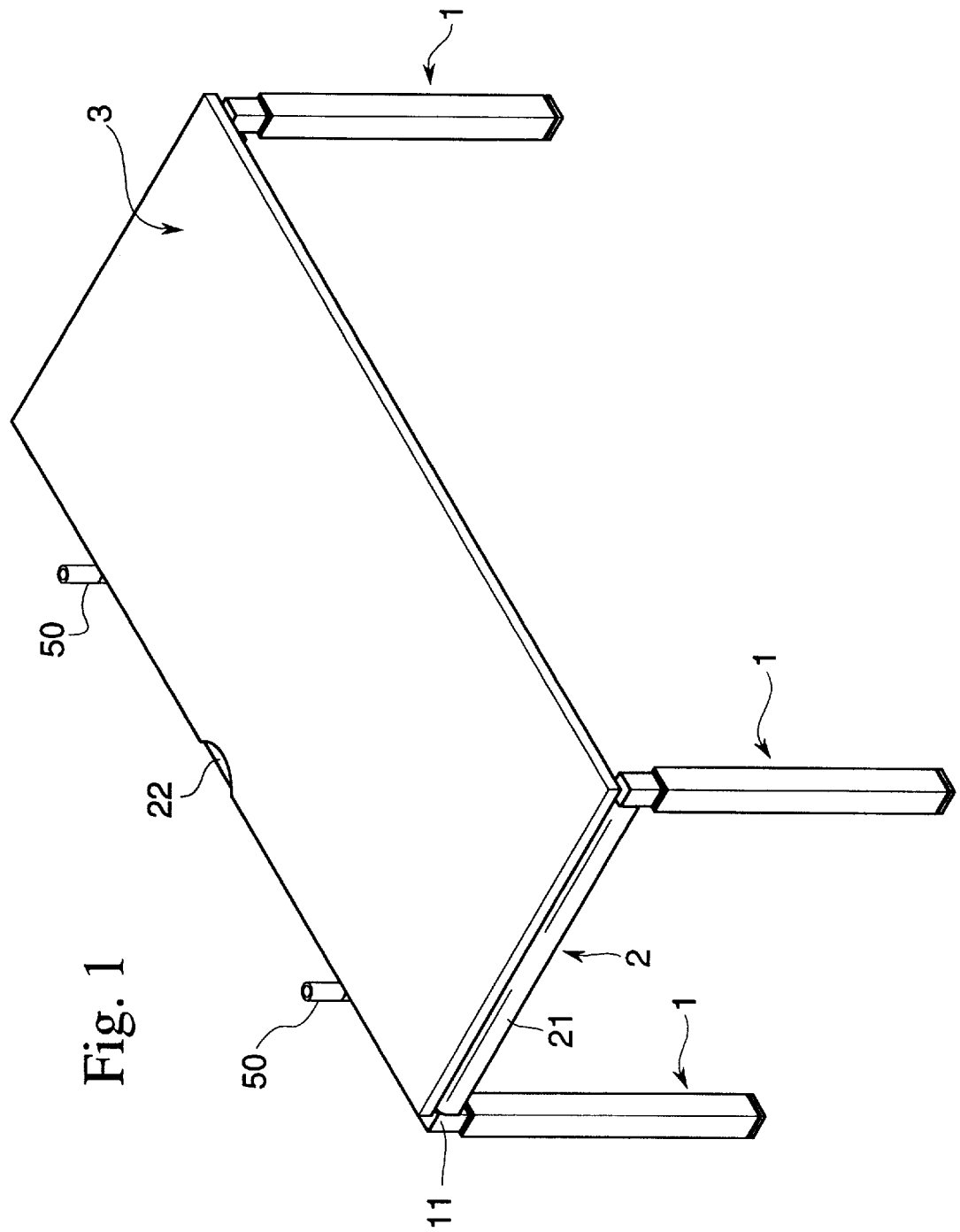
FIG. 1 is an overall perspective view showing one embodiment of the invention.
Figure 2:
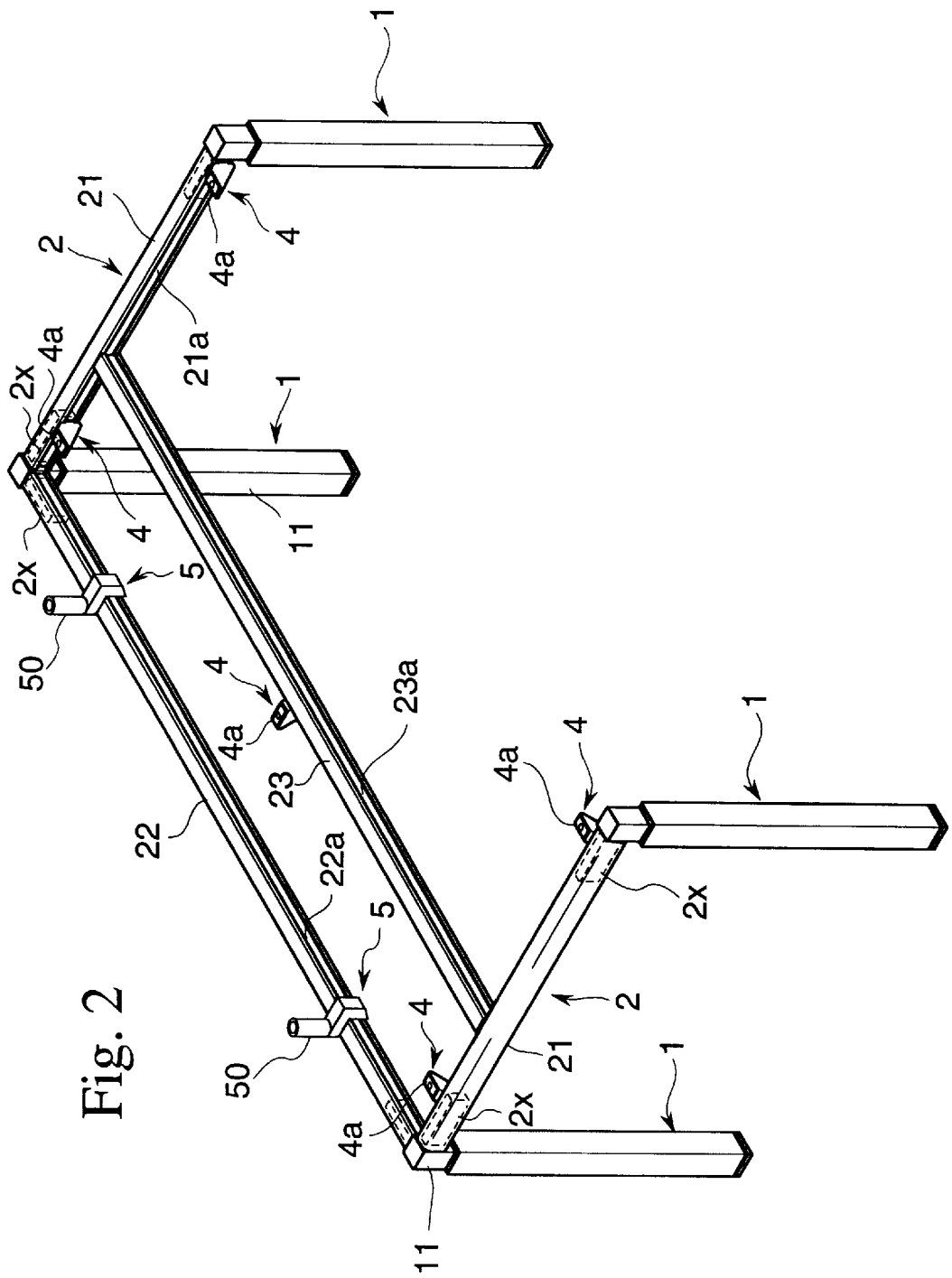
FIG. 2 is a perspective view wherein a top plate of the embodiment is omitted to draw.
Figure 3:
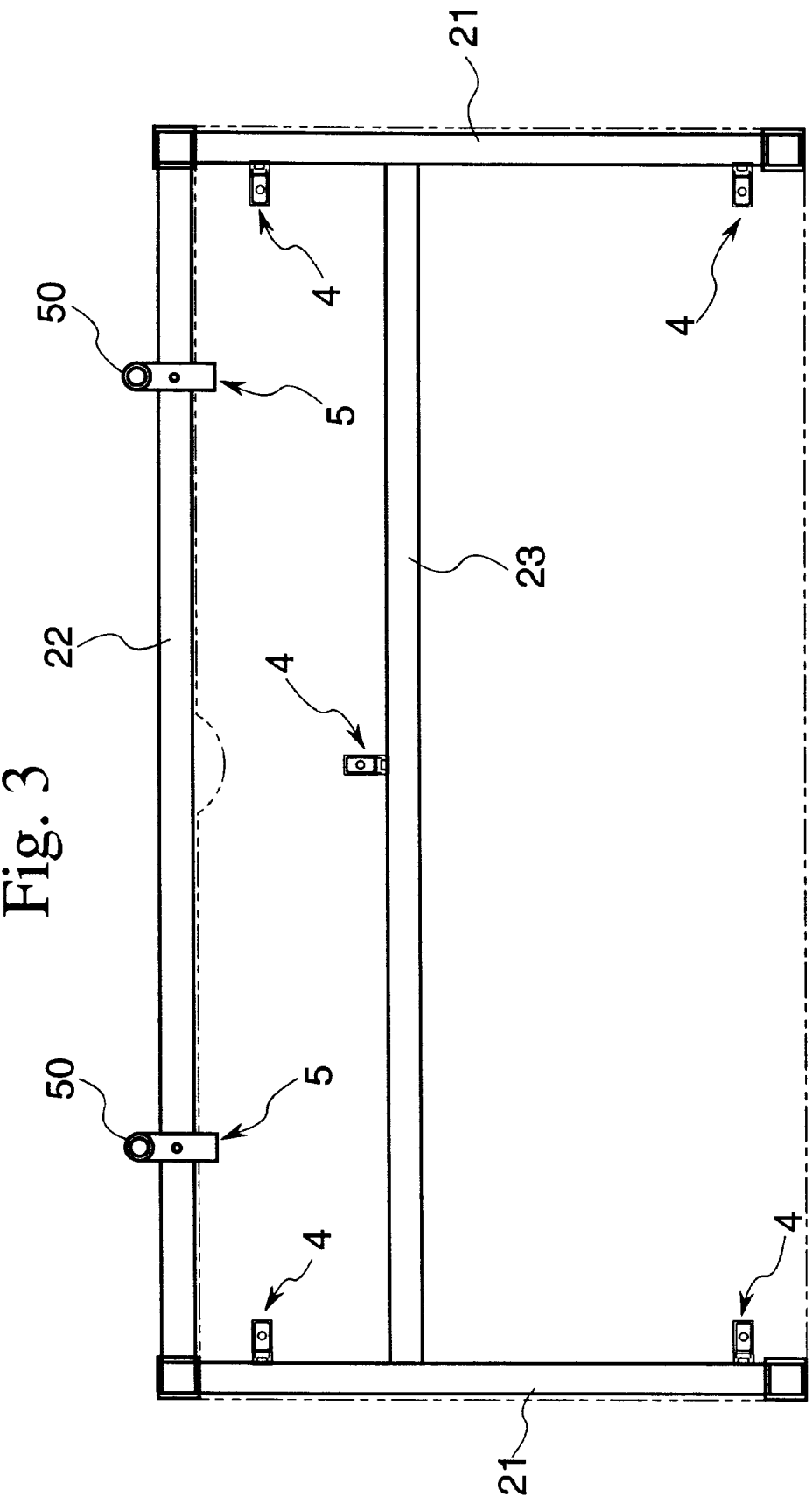
FIG. 3 is a plane view showing the top plate in an imaginary line.

The desk has an arrangement, as shown in FIGS. 1 through 3, that each of four leg support posts 1 is connected at the upper end thereof through a frame 2 and a top plate 3 is supported by the frame 2.

Each of the leg support posts 1 is of a square pipe and arranged at four corners or near the corners of the rectangular top plate 3 with an upper end of the leg support post 1 facing to an underside of the top plate 3. The frame 2 comprises a pair of side frame members 21 which connect the leg support posts 1 arranged at a front side and a user's side at near the top end of the inner surfaces of the leg support posts 1 which face each other along a direction of depth, a front frame member 22 which connects the side leg support posts 1 arranged at the front side at adjacency of the top end of the inner surfaces which face each other along a direction of width, and reinforcing frame member 23 which connects the side frame members 21 at a little front side of the center of the inner surfaces which face each other. This frame 2 constitutes a self standing structure together with each of the leg support posts 1 by prohibiting each other from being apart.

Figure 4:
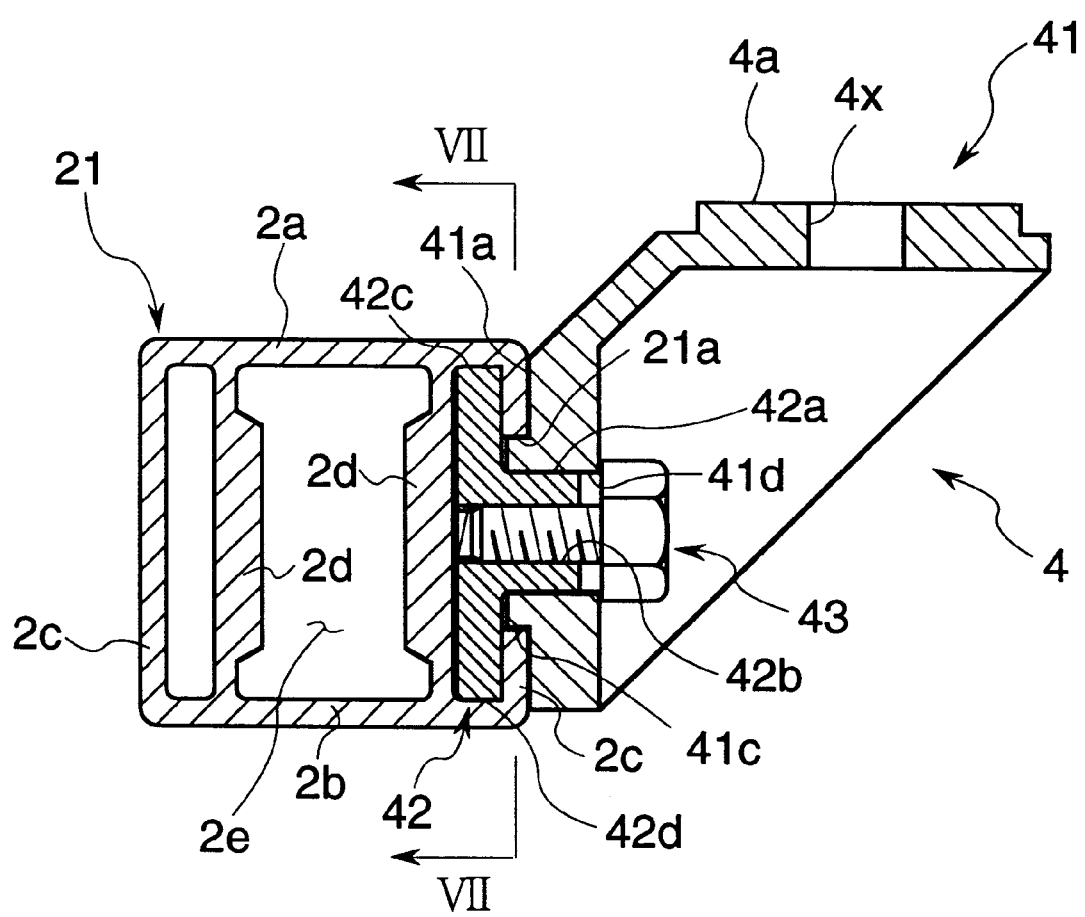
FIG. 4 is a magnified cross-sectional view of a principle part of a side frame member.

Each of the side frame members 21 and the front frame member 22 is made of an extruded form of a material having rigidity such as aluminum which is cut in a required length and has an isometric cross-section as shown in FIG. 4. As shown in the cross-section, each of the side frame members 21 and the front frame members 22 has a top wall 2a, a bottom wall 2b, side walls 2c and two inner walls 2d which divide the side walls 2c so as to constitute a square pipe. A hollow portion 2e surrounded by the top wall 2a, the bottom wall 2b and the side walls 2c is a space for mounting the frame members 21, 22 on the leg support post 1. The frame members 21, 22 and the leg support posts 1 are connected through an arm 2x which is shown in imaginary lines in FIG. 2 by inserting the arm 2x which has previously been mounted on a wall face of the leg support post 1 into the hollow portion 2e so as to fit whole of the frame members 21, 22 over the arm 2x and tightening a screw at a required position.

Figure 5:
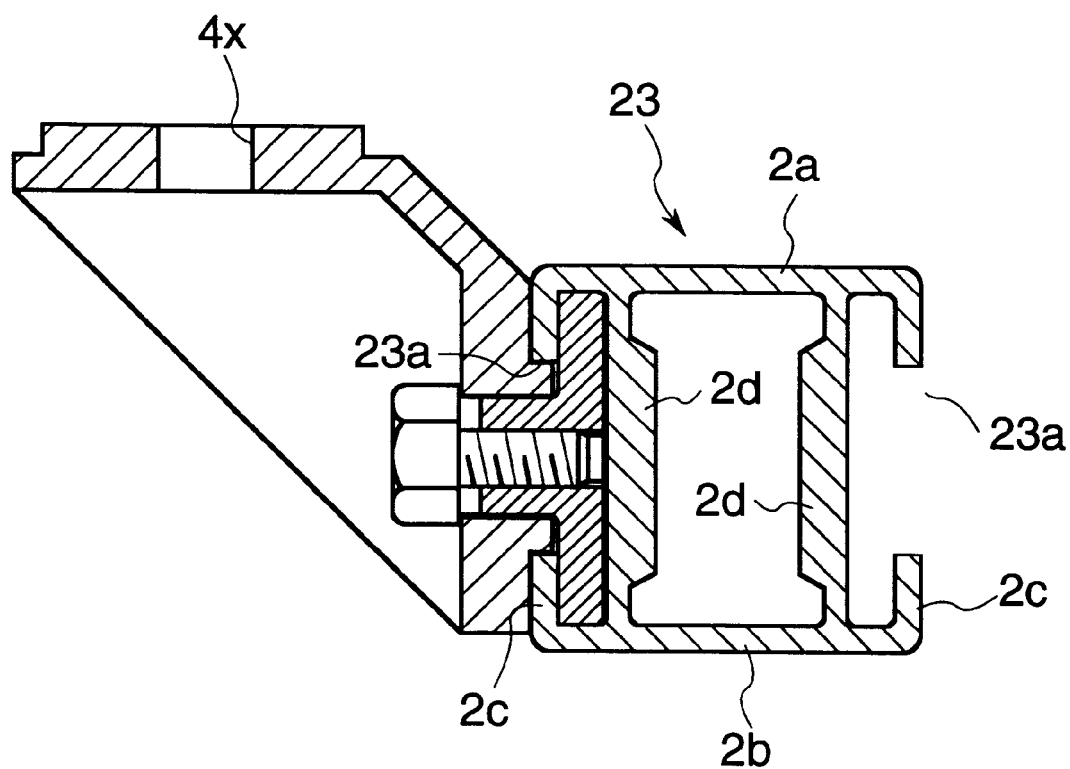
FIG. 5 is a magnified cross-sectional view of a principle part of a front frame member.
Figure 6:
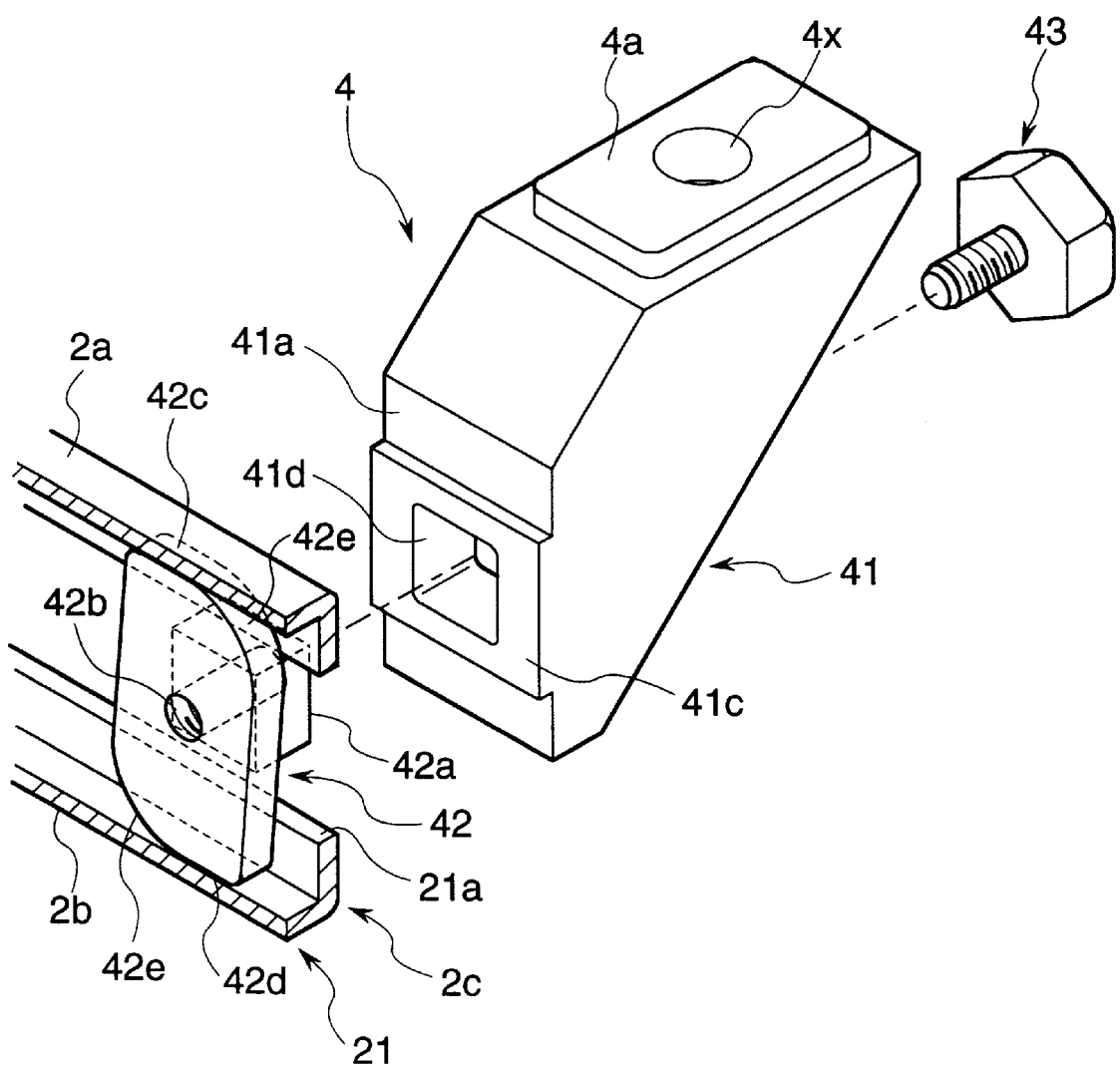
FIG. 6 is an exploded partially sectional perspective view showing an arrangement of mounting a mounting member for a top plate.
Figure 7:
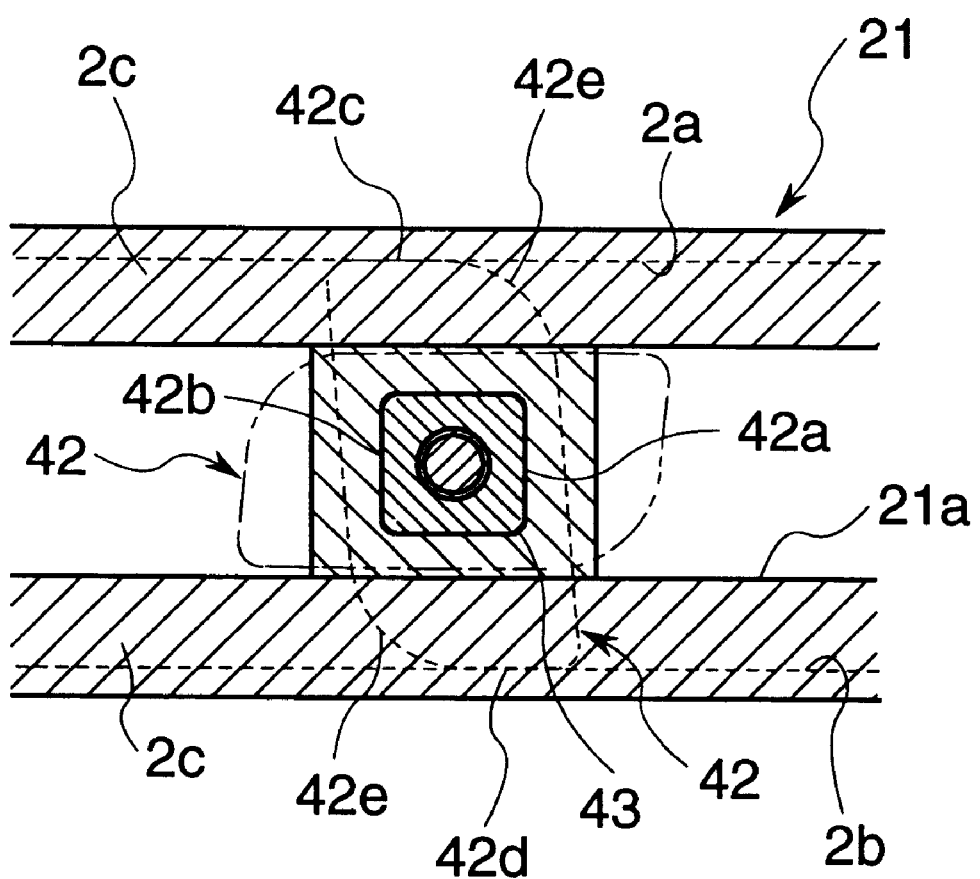
FIG. 7 is a sectional view taken along line VII—VII in FIG. 4.

The reinforcing frame member 23 is, as shown in FIG. 5, also made of an extruded form of a material having rigidity such as aluminum which is cut in a required length and has substantially the same top wall 2a, a bottom wall 2b, side walls 2c and inner walls 2d.

In addition, in this embodiment, at the center of one of the side walls 2c of the frame members 21, 22 provided is a rail groove 21a, 22a which has an opening extending longitudinally and continuously and at the center of both side walls 2c of the frame member 23 provided is a rail groove 23a which has an opening extending longitudinally and continuously. By making use of an appropriate position of these rail grooves 21a, 22a, 23a, a top plate 3 and various optional components such as a telephone stand shown in FIG. 10, an auxiliary top plate 200 shown in FIG. 11, an electrical outlet 300 shown in FIG. 12, an information outlet 400 shown in FIG. 13, a cable-containing duct 500 shown in FIG. 14 or the like can be mounted through a mounting member 4 through 7.

The mounting member 4 is for mounting the top plate 3 and comprises a bracket 41, a liner member 42 and a screw 43 as shown in FIGS. 3, 4, 6 and 7. The mounting member 4 is mounted on at least two positions, namely front side and the user's side, of each of the side frame members 21. The bracket 41 is made of rigid material such as a die casting material and comprises a base wall portion 41a which makes an abutting contact with the side wall 2c of the side frame member 21 and a mounting surface 4a which is formed upward of the base wall portion 41a with an engaging projection 41c whose vertical size is a little smaller than that of an opening of the rail groove 21a of the side frame member 21 provided and a rectangular fitting hole 41d formed at the engaging projection 41c and the base wall portion 41a.

The liner member 42 has a shape of general parallelogram and at the center thereof provided is a fitting projection 42a which fits over the fitting hole 41d of the bracket 41 and a threaded hole 42b is threaded at the center of the fitting projection 42a so that a screw 43 can be helically connected therewith. The least distance between the upper side 42c and the base side 42d of the liner member 42 generally corresponds to the interior measurement between the upper wall 2a and the base wall 2b and the upper right hand half of the upper side 42c and the lower left hand half of the base side 42d are formed to have a radius surface 42e whose axis coincides with that of the threaded hole 42b.

More specifically, the whole of the mounting members 4 can be fixed by steps of arranging the base wall 41a affixed to an outer face of the side wall 2c standing upright and the liner member 42 affixed to an inner face of the side wall 2c in the rail groove 21a with the engaging projection 41c of the bracket 41 engaged with the opening edges of the rail groove 21a, and with this condition kept, helically connecting the screw 43 which has passed through the bracket 41 with the liner member 42 while pulling the liner member 42 closer to the bracket 41 so that the side wall 2c can be held between the bracket 41 and liner member 42. The liner member 42 has an arrangement that it can pass through an opening of the rail groove 21a in a condition as shown in imaginary lines in FIG. 7, then can be rotated at a predetermined angle so as to make an abutting contact with a position which extends over the inner faces of the upper and lower side walls 2c after passing over the rail groove 21a and the upper side 42c and the base side 42d can make an abutting contact with each of the inner faces of the upper wall 2a and the base wall 2b of the side frame members 21 at a predetermined position. The radius surface 42e is to avoid interference when the liner member 42 is rotated.

In this embodiment, for supporting the center of the underface of the top plate 3 the mounting member 4 is mounted on the longitudinal center of the rail groove 23a of the reinforcing frame member 23. The arrangement of mounting the bracket 41 which constitutes the mounting member 4 on the rail groove 23a is the same as that of the rail groove 21a.

As mentioned above, the top plate 3 of the embodiment can be fixed to the frame members 21, 23 by steps of fixing five pieces of the mounting members 4 to the front and back positions of each of the side frame members 21 and the center of the reinforcing frame member 23, placing the top plate 3 on the mounting face 4a of the mounting members 4 and screwing a screw from underside of the top plate 3 through a through hole 4x which is provided at the mounting surface 4a.

The top plate 3 of the embodiment has an arrangement that a plurality of materials for a top plate are overlapped along a direction of depth so as to show a grain of wood along a direction of width. With this arrangement, the top plate 3 produces a high strength against a load which is applied by placing something even if the top plate 3 is supported by the brackets 4 at only four corners and the center thereof.

Figure 8:
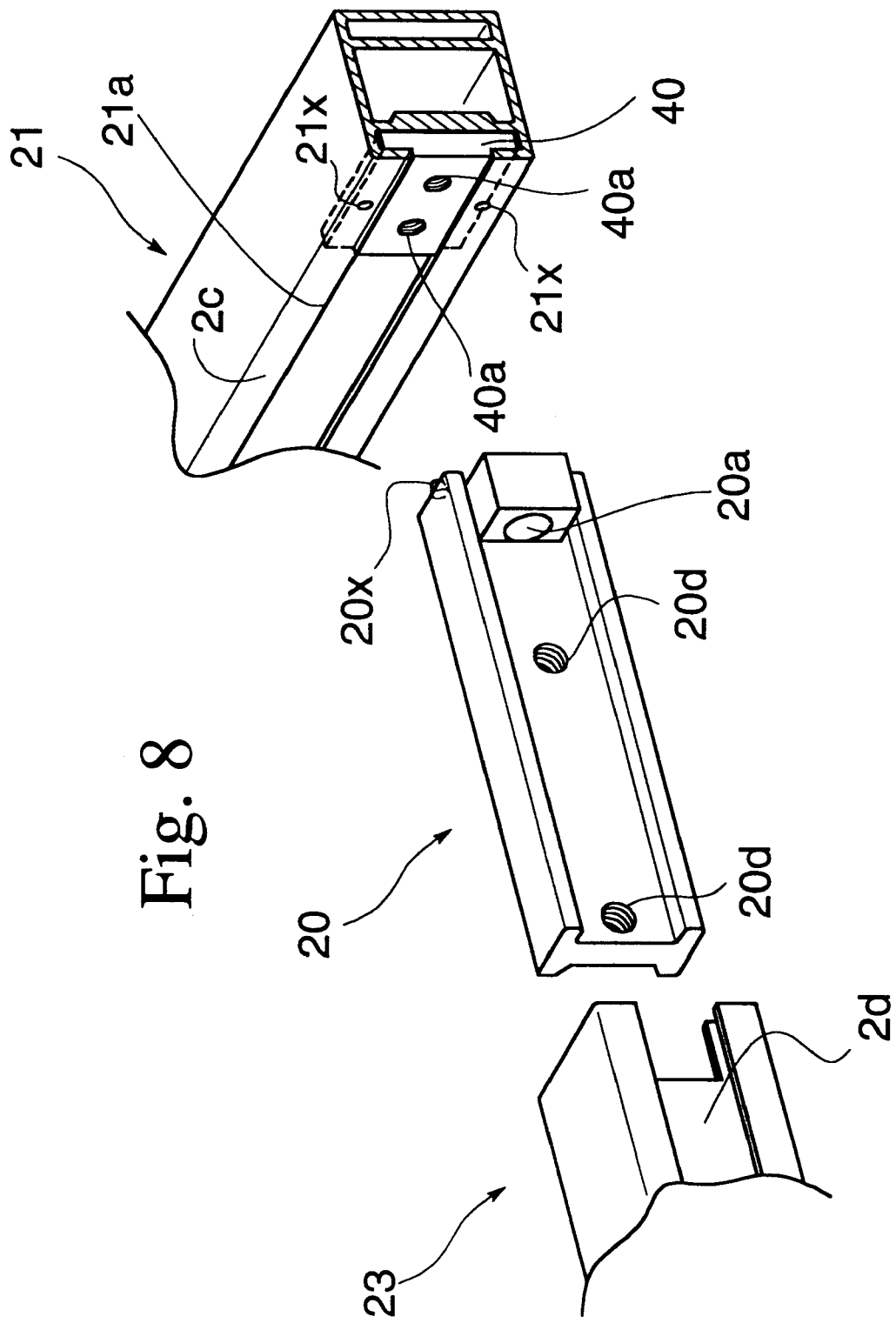
FIG. 8 is an exploded perspective view showing an arrangement of mounting the reinforcing frame member.

In this embodiment, the reinforcing frame member 23 is also mounted on the side frame members 21 by means of the rail groove 21a. More specifically, for mounting the reinforcing frame member 23 on the side frame member 21, as shown in FIG. 8, an arm 20 whose traverse sectional view is a shape of "I" is mounted on the side frame member 21, the hollow portion 2e of the reinforcing frame member 23 is fitted over the arm 20 and a screw, which is not shown in drawings, is inserted into the threaded hole 20d of the arm 20 through the inner wall 2e of the reinforcing member 23. The arm 20 is provided with a through hole 20a which is formed at a position displaced aside from the end face thereof and tapered projections 20x which are formed at the upper and under positions of the end face thereof. The arm 20 can be fixed to the side wall 2c of the side frame member 21 in a condition of tightly attached thereto by steps of, inserting a plate nut 40, which is equivalent to the liner member 42, having a threaded hole 40a at a position which corresponds to the through hole 20a into the rail groove 21a of the side frame member 21 so that the plate nut 40 is affixed to the inner face of the rail groove 21a, helically connecting a screw, not shown in drawings, which passes through the through hole 20a from a direction of the arm 20 with the threaded hole 40a so that the side wall 2c is held between the arm 20 and the plate nut 40. On the side wall 2c of the side frame member 21 provided is engaging holes 21x which make tapered engagement with the tapered projection 20x of the arm 20.

Figure 9:
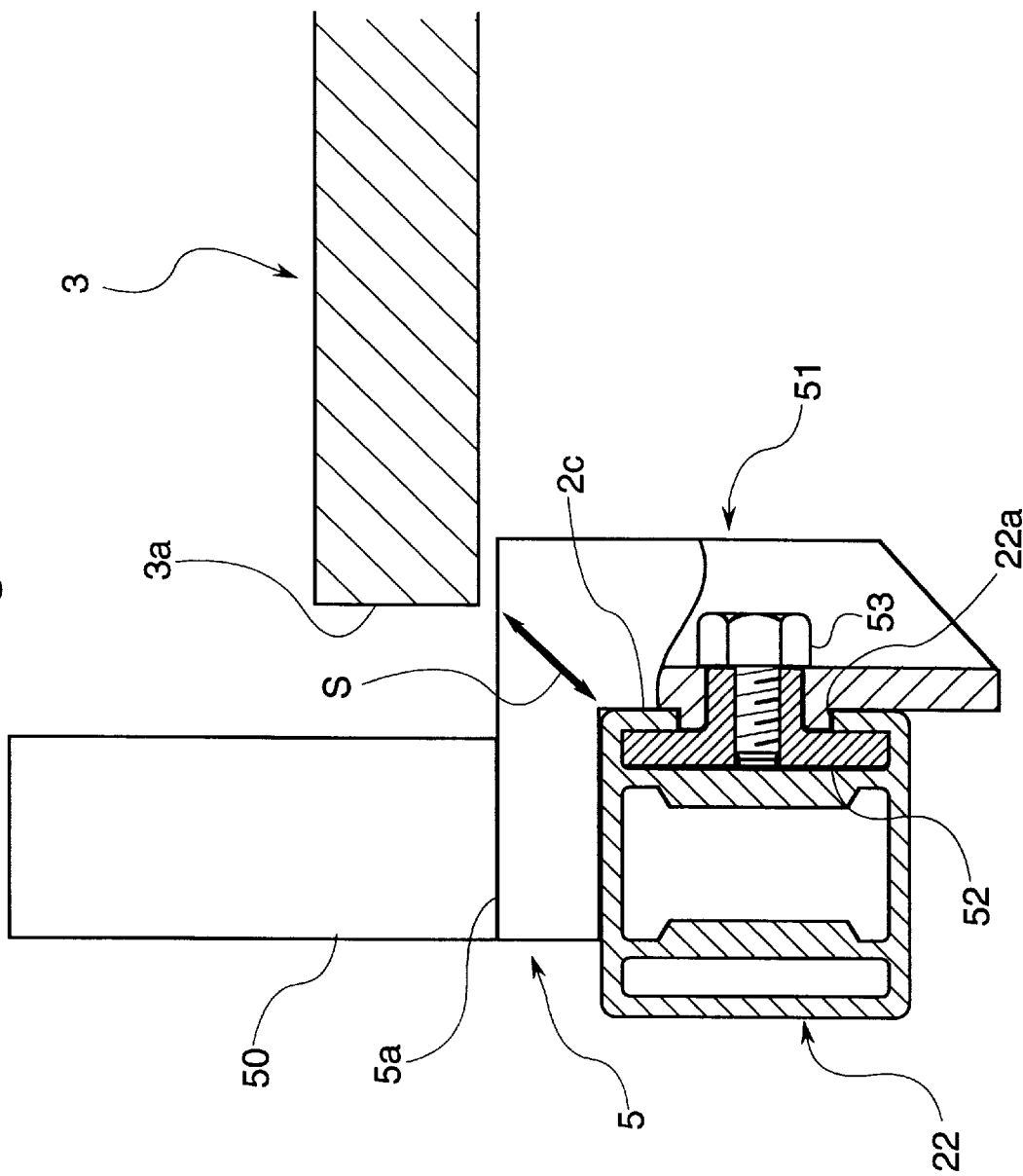
FIG. 9 is a cross-sectional view showing an arrangement of mounting a mounting member for an option.
Figure 10:
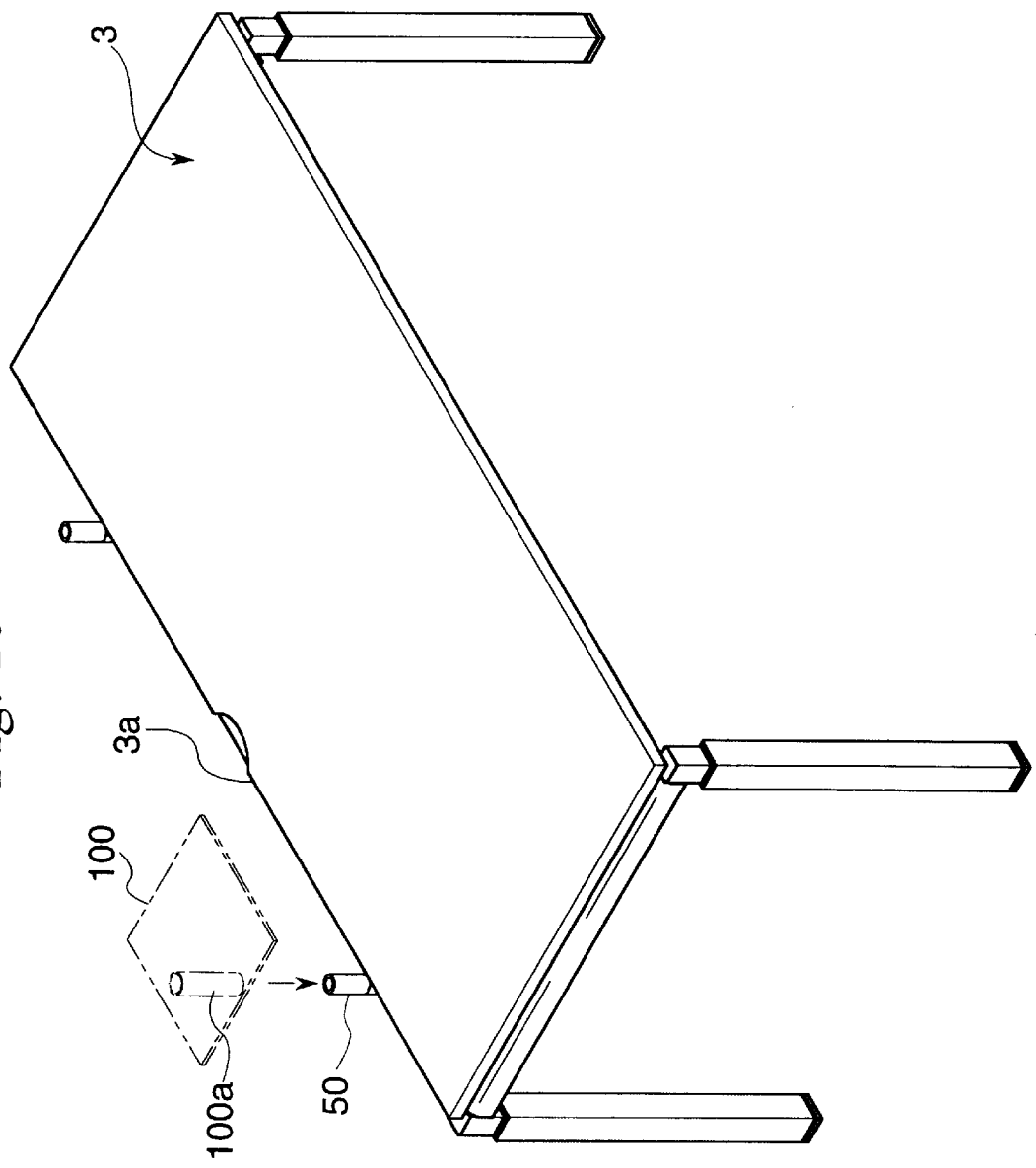
FIG. 10 is a perspective view showing a manner to mount a stand as an option.
Figure 11:
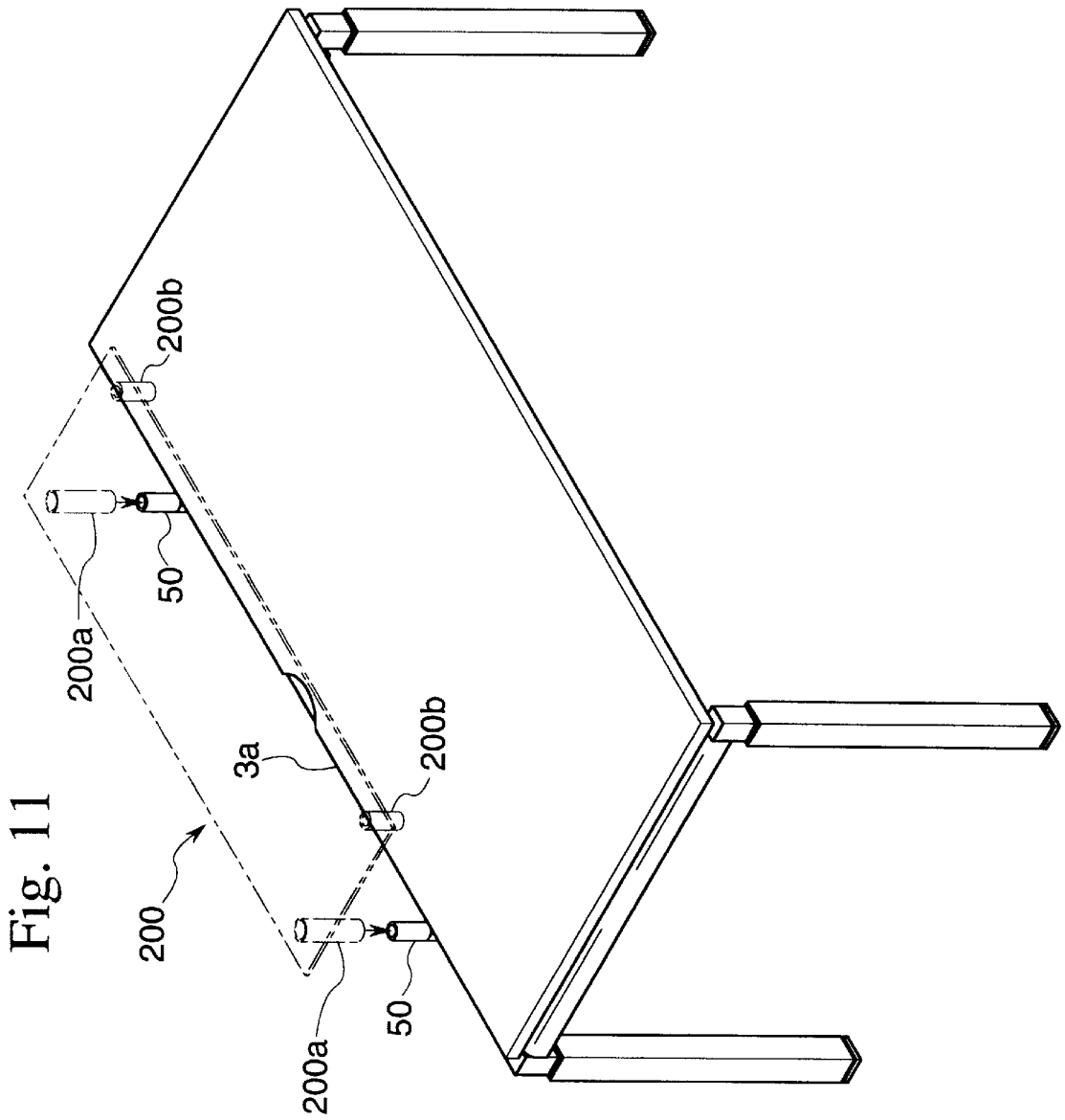
FIG. 11 is a perspective view showing a manner to mount an auxiliary top plate as an option.

The mounting member 5 is for mounting the optional components such as a telephone stand or a PC stand by making use of the front frame member 22. The mounting member 5 comprises a bracket 51 which is equivalent to the bracket 41, a liner member 52 which is equivalent to the liner member 42 and a screw 53 which is equivalent to the screw 43, as shown in FIG. 9. More specifically, the arrangement of mounting the mounting member 5 on the front frame member 22 is the same as that of the mounting member 4. The mounting members 5 can be fixed to the front frame member 22 by steps of inserting a part of a base side of the bracket 51 of the mounting member 5 into the rail groove 22a and arranging its surrounding area affixed to the upright standing side wall 2c while inserting the liner member 52 into the rail groove 22a and helically connecting the screw 53 which has passed through the bracket 51 with the liner member 52 so that the side wall 2c of the front frame member 22 can be held between the bracket 51 and liner member 52. The shape of the bracket 51 is different from that of the bracket 41 in a point that a mounting face 5a of the bracket 51 can be overhung in front of the front end 3a of the top plate 3 through a space S which is formed between the front frame member 22 and the top plate 3. A pipe member 50 can be arranged upright on the mounting face 5a which overhangs in front of the front end 3a. More specifically, in order to attach a stand 100 which can be utilized as a telephone stand or a PC stand, as shown in FIG. 10, to the desk, a leg 100a is arranged at the underface of the stand 100 perpendicular thereto and hanging from thereof and the leg 100a is inserted over the pipe member 50 so that the stand 100 can be mounted on adjacency of the front end 3a of the top plate 3. In order to attach an auxiliary top plate 200 to the desk as shown in FIG. 11, legs 200a are arranged at two positions on the underface of the auxiliary top plate 200 perpendicular thereto and hanging from thereof and the legs 200a are inserted over the pipe member 50 so that the auxiliary top plate 200 can be mounted on adjacency of the front end 3a of the top plate 3. Under the auxiliary top plate 200 at the user's side arranged is an auxiliary leg 200b which lands softly on the top plate 3.

Figure 12:
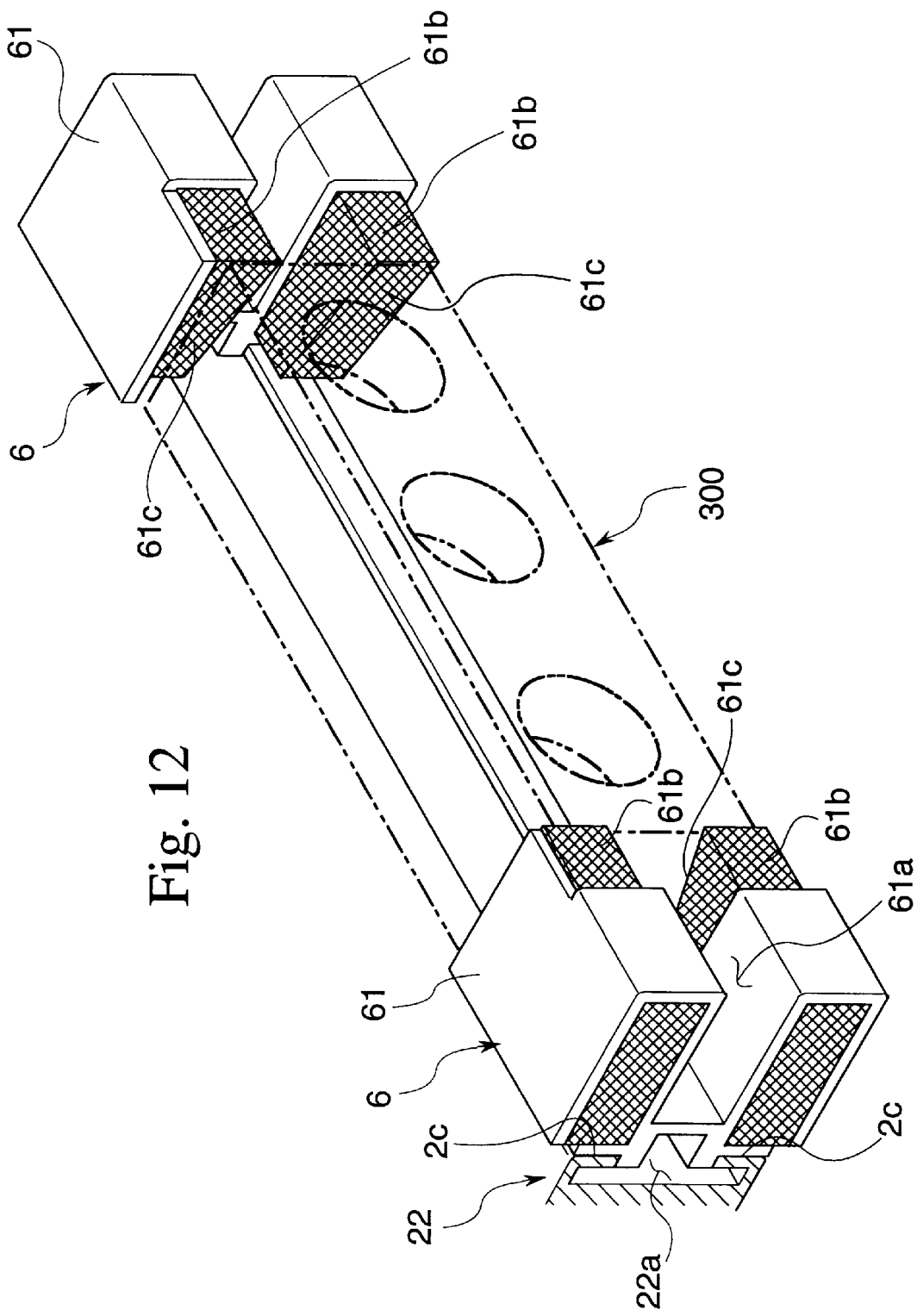
FIG. 12 is a perspective view showing a manner to mount an electrical outlet as an option.
Figure 13:
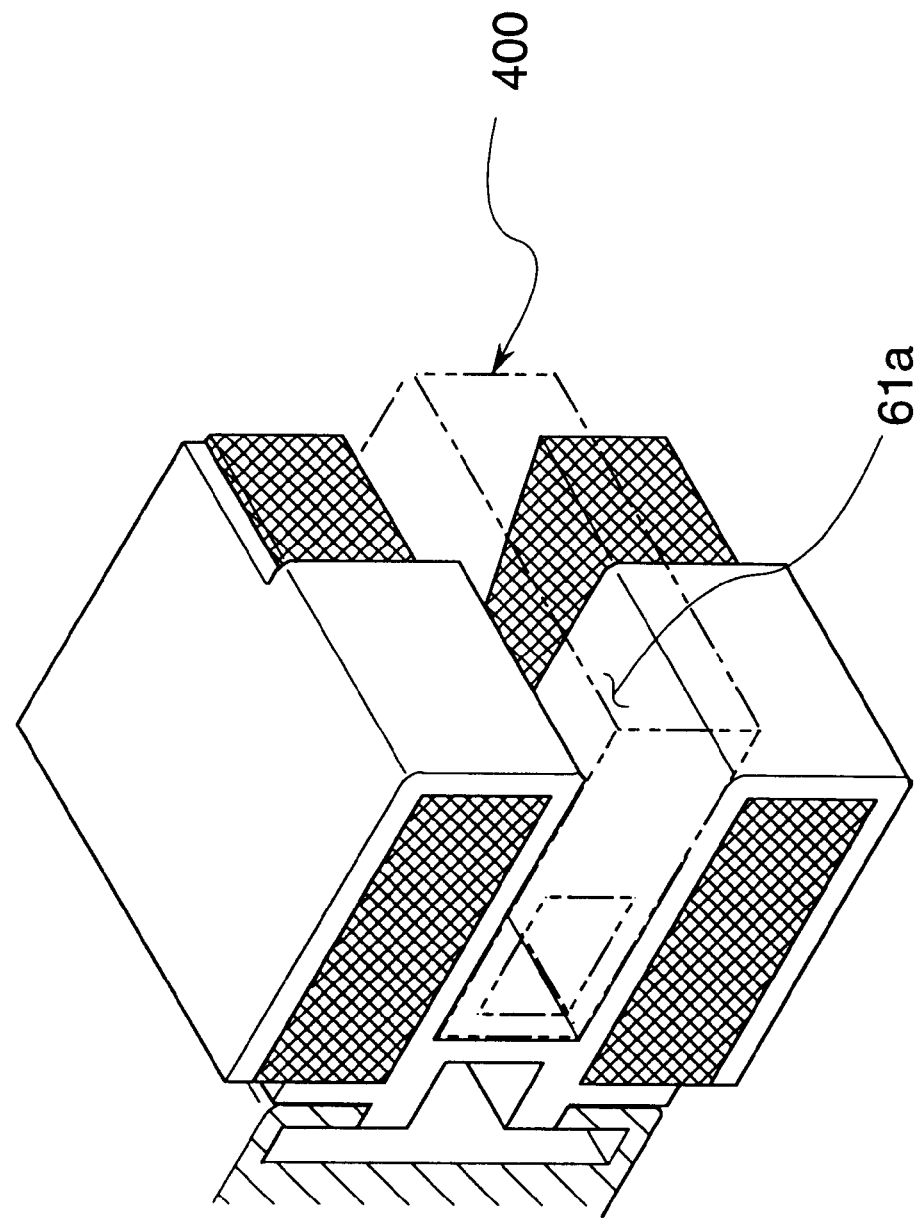
FIG. 13 is a perspective view showing a manner to mount an information outlet as an option.
Figure 14:
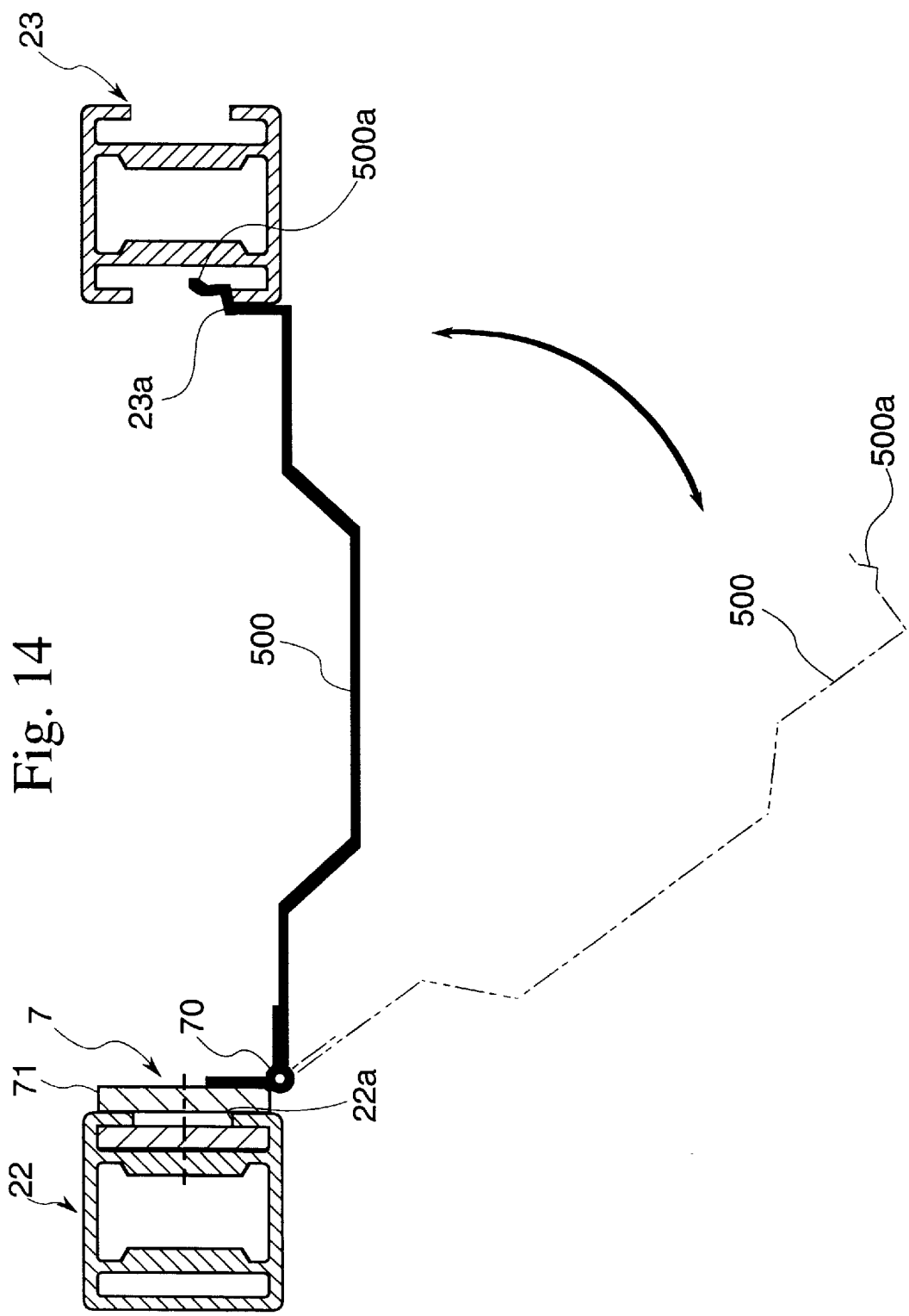
FIG. 14 is a schematic cross sectional view showing a manner to mount a cable-containing duct as an option.

The mounting member 6 is for mounting an electrical outlet 300 as shown in FIG. 12 or an information outlet 400 as shown in FIG. 13 and a bracket 61 which is a main component of the mounting member 6 is, like each of the brackets 41 and 51, mounted on the front frame member 22 by holding the upright side wall 2c which locates upside and downside of the rail groove 22a of the front frame member 22 by making use of a liner member and a screw, not shown in drawings. The bracket 61 comprises a concave portion 61a which opens toward the side and the user's side and a clipping element 61b made of resin or rubber which projects at one end thereof. For mounting the information outlet 400 as shown in FIG. 13 push the information outlet 400 into the concave portion 61a so that it can be held at a position into which the information outlet 400 is pushed. For mounting the electrical outlet 300 as shown in FIG. 12, mount a pair of the mounting members 6 on the rail groove 22a and hold the electrical outlet 300 between the clipping elements 61b of the mounting members 6. The clipping element 61b is provided with a tapered face 61c which transforms a holding force into a force which pushes the electrical outlet 300 against the front frame member 22 so as to stabilize a mounting condition.

Further, the mounting member 7 comprises mainly a bracket 71 which is to be mounted on the rail groove 22a of the front frame member 22 in substantially the same manner as the mounting members 4 through 6. A cable-containing duct 500 is hinged by the bracket 71 through a hinge 70. Turn the the cable-containing duct 500 around the hinge 70 as a fulcrum so that an engaging claw 500a arranged at the rear end of the cable-contained duct 500 can make an engagement with the rail groove 23a of the reinforcing frame member 23.

As mentioned above, in the desk of the embodiment, the rail groove 21a, 22a, 23a forms a longitudinally continuous mounting portion, a certain position of the mounting portion is selected to hold the mounting member 4 through 7 and the top plate 3 and various optional components such as the stand 100, the auxiliary top plate 200, the electrical outlet 300, the information outlet 400, the cable-containing duct 500 or the like can be mounted on the mounting member 4 through 7.

In accordance with the arrangement, in case a position at which the top plate 3 is supported or a position on which an optional component is mounted is diversified because of variance of a specification of a top plate 3 according to a standard, or appearance of an odd-shaped top plate which does not meet a conventional standard, it becomes possible to deal with this case with ease if a position on which the mounting member 4 through 7 is mounted can be selected optionally from the longitudinally continuous mounting portion of the frame 2, and the mounting member 4 through 7 for mounting a component such as optional components or a top plate 3 can be held at the position.

Figure 15:
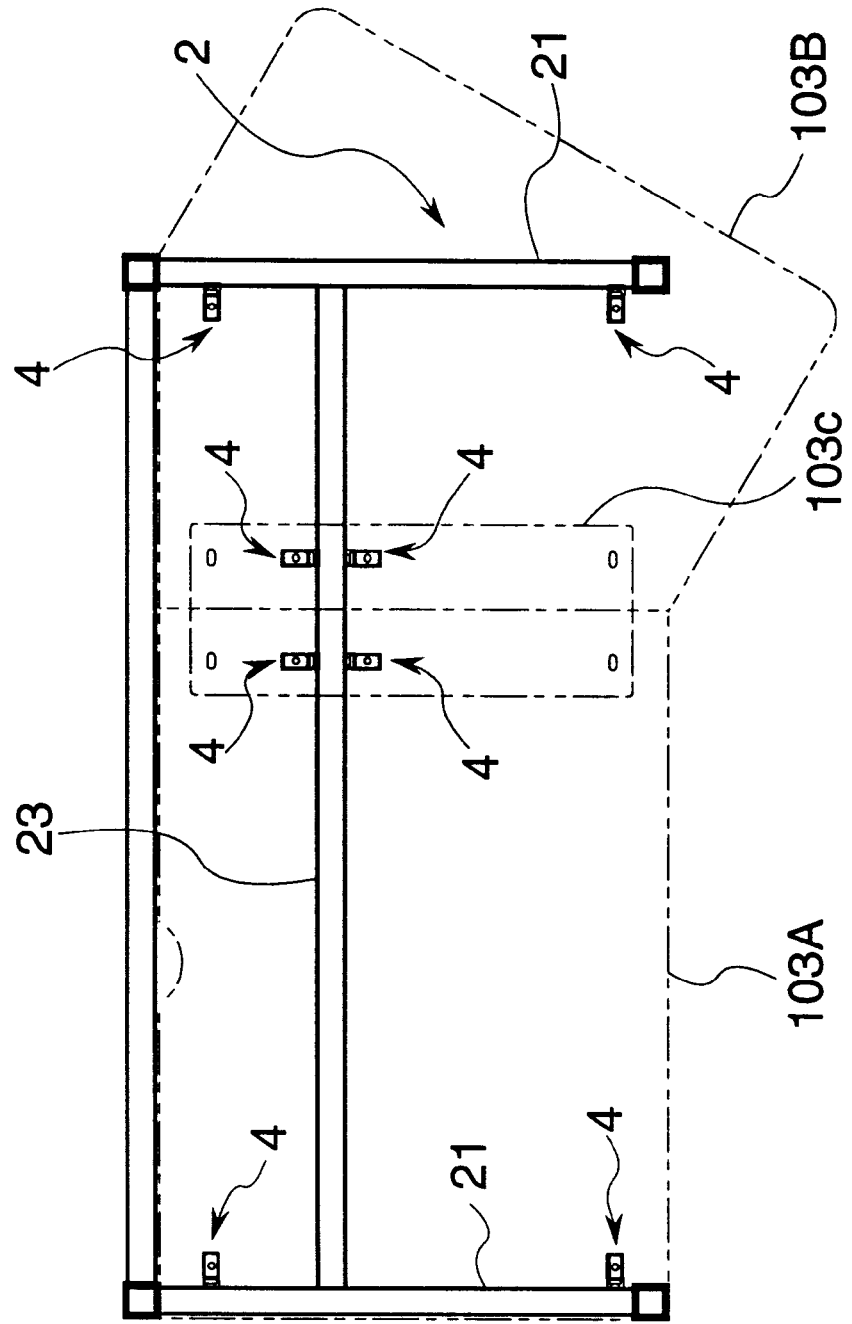
FIG. 15 is a plane view showing a desk wherein a top plate which has a different specification is mounted on the frame of the embodiment and which corresponds to FIG. 3.

Concrete examples of the above are shown in FIGS. 15 through 18. In FIG. 15, an odd-shaped top plate 103B is mounted adjoining to a main top plate 103A with a side thereof overhanging a little from the frame 2. A width of the main top plate 103A is a little narrower than that of the top plate 3. Two pairs of mounting members 4 are held at appropriate positions which are selected optionally on both sides of the rail groove 23a of the reinforcing frame member 23, a top plate support plate 103C is mounted on these mounting members 4, each side of the main top plate 103A and the odd-shaped top plate 103B is fixed to the top plate support plate 103C and other side of each of the main top plate 103A and the odd-shaped top plate 103B is supported by the mounting members 4 which is mounted on the side frame members 21. This arrangement makes it possible to extend an area of a top plate without changing the frame 2.

Figure 16:
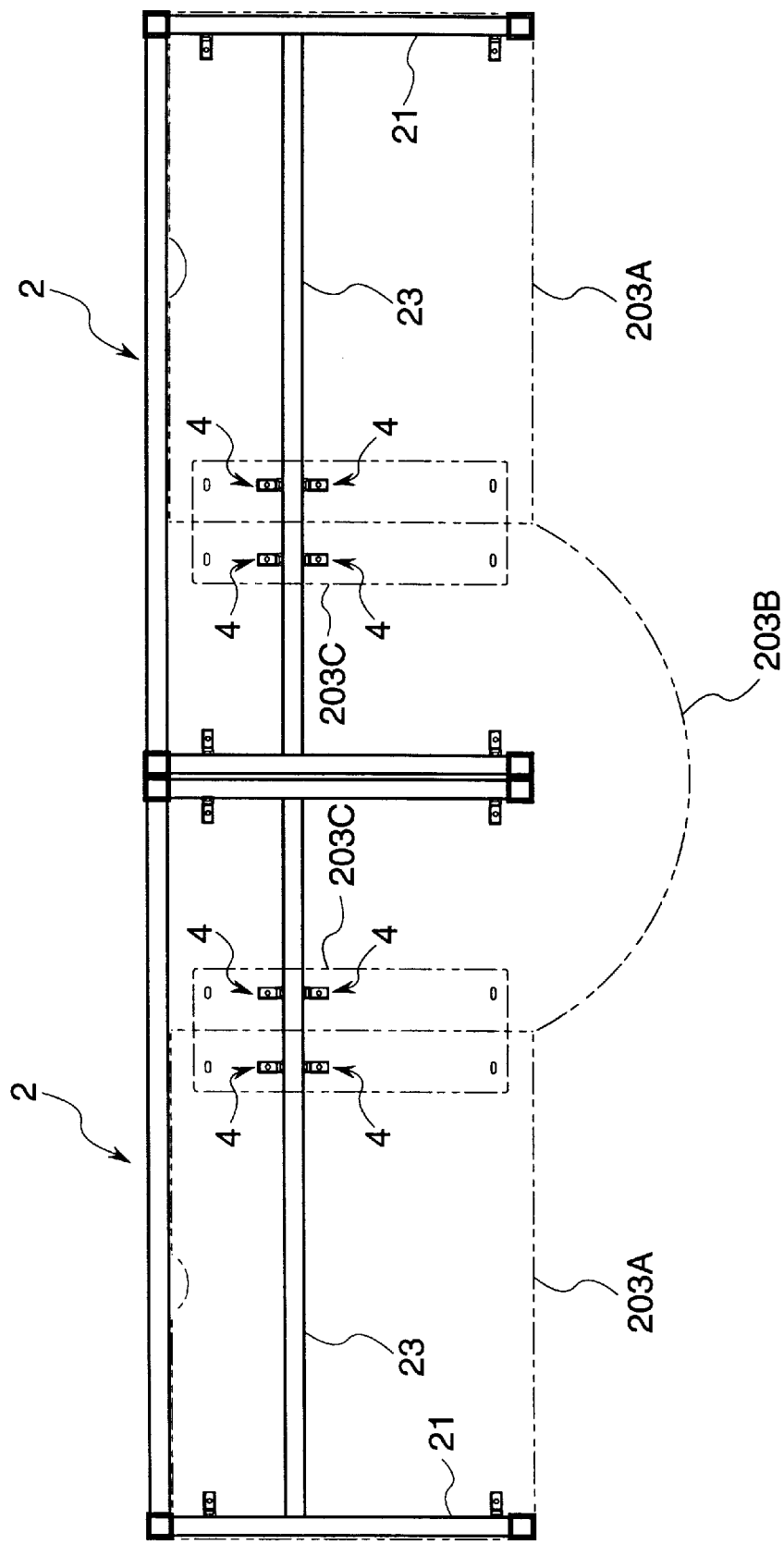
FIG. 16 is a plane view showing a desk wherein a top plate which has a different specification is mounted on the frame of the embodiment and which corresponds to FIG. 3.

In FIG. 16, two frames 2 are adjoined, two main top plates 203A whose width is a little smaller than a distance between the side frame members 21, like the main top plate 103A, are placed at positions each displaced aside toward the side frame members 21 which locate on the opposite side of adjoining the frames 2 and an odd-shaped top plate 203B which overhangs fairly toward a user's side to form a curve is placed in a space between the main top plates 203A so as to extend an area of a top plate. In this case also, two pairs of mounting members 4 are held by the reinforcing frame member 23 of the frame 2, a top plate support plate 203C, which is similar to the top plate support plate 103C, is mounted on these mounting members 4 and one side of the main top plates 203A and both sides of the odd-shaped top plate 203B are supported by the top plate support plates 203C. This arrangement makes it possible to extend an area of a top plate without changing the frame 2.

Figure 17:
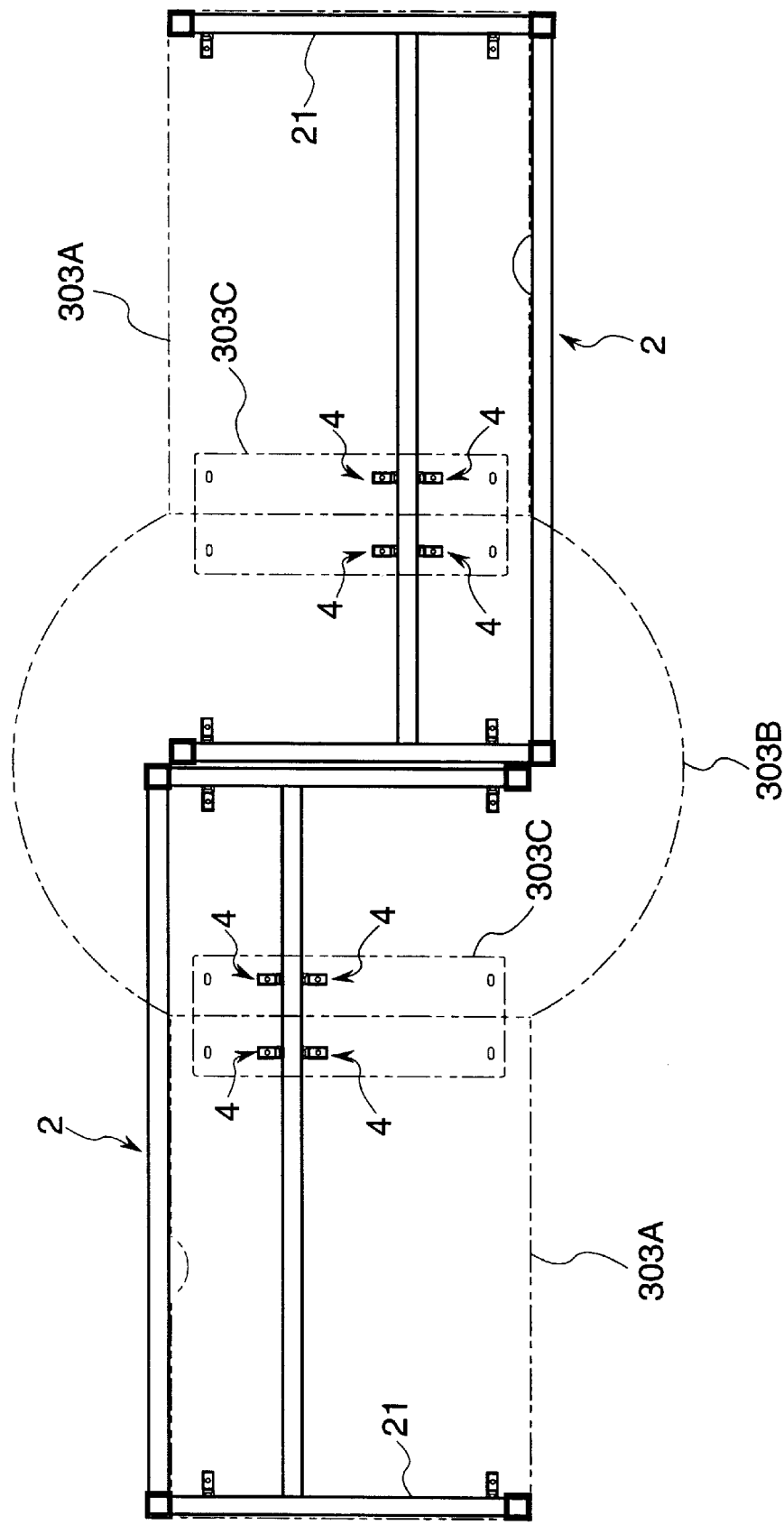
FIG. 17 is a plane view showing a desk wherein a top plate which has a different specification is mounted on the frame of the embodiment and which corresponds to FIG. 3.

In FIG. 17, two frames 2 are adjoined with a direction reversed, two main top plates 303A whose width is a little shorter than a distance between the side frame members 21, like the main top plate 103A or 203A, are placed at positions each displaced aside toward the side frame members 21 which locate on the opposite side of adjoining the frames 2 and an odd-shaped top plate 303B which overhangs fairly both toward a user's side and frontward to form a curve is placed in a space between the main top plates 303A so as to extend an area of a top plate. In this case also, two pairs of mounting members 4 are held by the reinforcing frame member 23, a top plate support plate 303C, which is similar to the top plate support plate 103C or 203C, is mounted on these mounting members 4 and a side of the main top plates 303A and both sides of the odd-shaped top plate 303B are supported by the top plate support plates 303C. This arrangement makes it possible to extend an area of a top plate without changing the frame 2.

Figure 18:
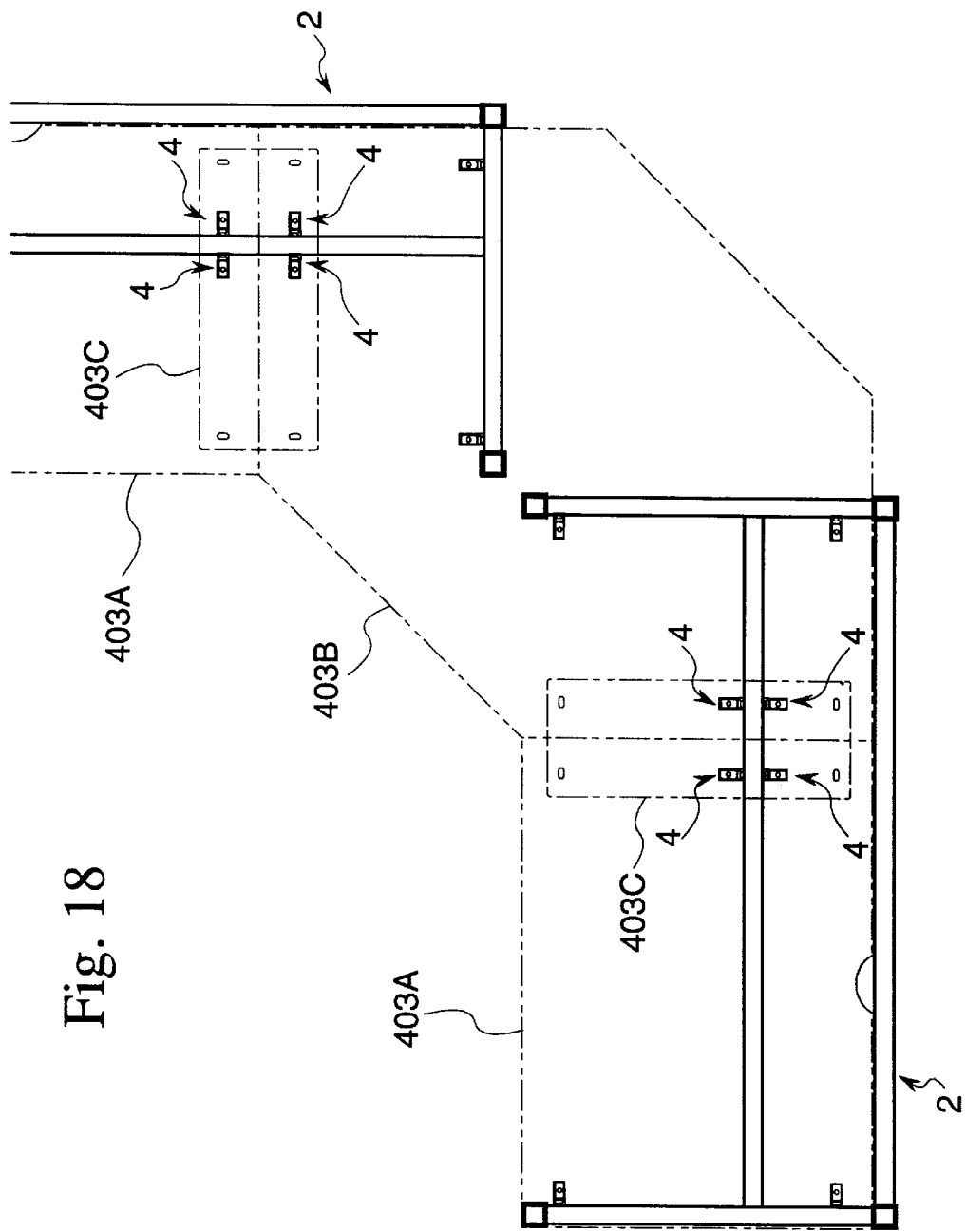
FIG. 18 is a plane view showing a desk wherein a top plate which has a different specification is mounted on the frame of the embodiment and which corresponds to FIG. 3.

In FIG. 18, two frames 2 are adjoined perpendicular, two main top plates 403A are placed similar to the above so as to form a space therebetween and an odd-shaped top plate 403B whose plane view is hexagon is placed in the space so as to extend an area of a top plate. In this case also, top plate support plates 403C, which are similar to the above, are mounted through these mounting members 4. This arrangement makes it possible to extend an area of a top plate without changing the frame 2.

As mentioned above, in this embodiment, a variety of top plates whose shape of specifications varies can be easily dealt with a common frame 2, so that there is no need of designing or manufacturing the frame 2 one by one to meet a specification as in the prior art, thereby to improve an efficiency in manufacturing the frame 2, resulting in improvement of an efficiency in manufacturing a desk.

A position at which the optional components such as the stand 100, the auxiliary top plate 200, the electrical outlet 300, the information outlet 400 or the cable-containing duct 500 are mounted can be changed optionally even though a position at which the mounting members 5, 6 or 7 are mounted is changed in accordance with the specification of the above top plate. As a result, an efficiency in manufacturing a desk is improved by far compared with a conventional desk in which a position at which these optional components are mounted or an arrangement of these optional components varies in accordance with a specification of the top plate.

Especially, in this embodiment, the position at which the mounting members 4 through 7 are mounted is formed continuously at the upright side wall 2c of the frame members 21, 22, 23 with the rail groove 21a, 22a, 23a made to open, and the base end of the mounting members 4 through 7 can make an engagement with the the rail groove 21a, 22a, 23a so that the position at which the mounting members 4 through 7 can easily be formed by means of extrusion and the mounting members 4 through 7 can be mounted in a fairly good condition.

Since the mounting member 4 comprises the bracket 41 having a mounting face 4a, the liner member 42 arranged at the base side of the bracket and the screw 43 helically connected with the liner member 42 passing through the bracket 41 and whole of the mounting member 4 can be fixed by steps of arranging the base end of the bracket 41 affixed to the outer face of the side wall 2c standing upright, arranging the liner member 42 affixed to the inner face of the side wall 2c in the rail groove 21a, and with this condition kept, helically connecting the screw 43 which has passed through the bracket 41 with the liner member 42 so that the side wall 2c can be held between the bracket 41 and the liner member 42, and other mounting members 5 through 7 have a similar arrangement, the mounting members 4 through 7 can be mounted or dismounted with ease and a position at which the mounting members 4 through 7 are mounted can be selected optionally.

In addition, in the mounting member 4, for example, since the liner member 42 is so made that it can pass through an opening of the rail groove 21a then can be rotated at a predetermined angle so as to make an abutting contact with a position which extends over the inner faces of the upper and lower side walls 2c after passing over the rail groove 21a, the liner member 42 can be arranged at a predetermined position by inserting into a rail groove 21a with ease. This effect can also be obtained for other mounting members 5, 6 and 7.

Further, since the space S is formed between the top plate 3 and the frame 2 and a part of the mounting member 5 can be overhung to the position at which the optional components are to be mounted near the edge of the top plate 3 through the space S, the stand 100 such as the telephone stand or the PC stand or the auxiliary top plate 200 can be mounted over or near the top plate 3 with the frame 2 used as a foothold.

In addition, since the mounting members 6 are mounted in pairs on the frame 2 and the electrical outlet 300 as the optional component can be held between the mounting members 6, the electrical outlet 300 can be mounted with ease even though the position at which the electrical outlet 300 is mounted is under the top plate 3. Further, since a distance between the mounting members 6 can be varied, it is possible for the mounting members 6 to mount the electrical outlet 300 of variety of sizes. The mounting members 6 are provided with the tapered face 61c which pushes the electrical outlet 300 against the front frame member 22 so that a condition in which the electrical outlet 300 is mounted becomes more stable.

In addition to the above effects, since the frame 2 of the embodiment comprises the right and left side frame members 21, the front frame member 22 which connects the side frame members 21 at the front end thereof and the reinforcing frame member 23 which connects the side frame members 21 at the center thereof wherein the frame members 21, 22, 23 are provided with the rail grooves 21a, 22a, 23a having isometric or generally isometric cross-section, the frame 2 can be manufactured easily by means of extrusion and the degree of freedom in selecting a portion for mounting the mounting members 4 through 7 can be increased by far. Especially, the reinforcing frame member 23 is provided with the rail groove 23a at both sides, thereby to increase further the degree of freedom in selecting a portion for mounting the mounting members 4 through 7.

In this embodiment, since the reinforcing frame member 23 is mounted on the side frame member 21 by means of engagement with the rail groove 23a, there is no need of other complicated mounting arrangement and the position at which the reinforcing frame member 23 is mounted can easily be changed only by changing a position of the engaging hole 21x which is arranged on the side frame member 21.

Figure 19:
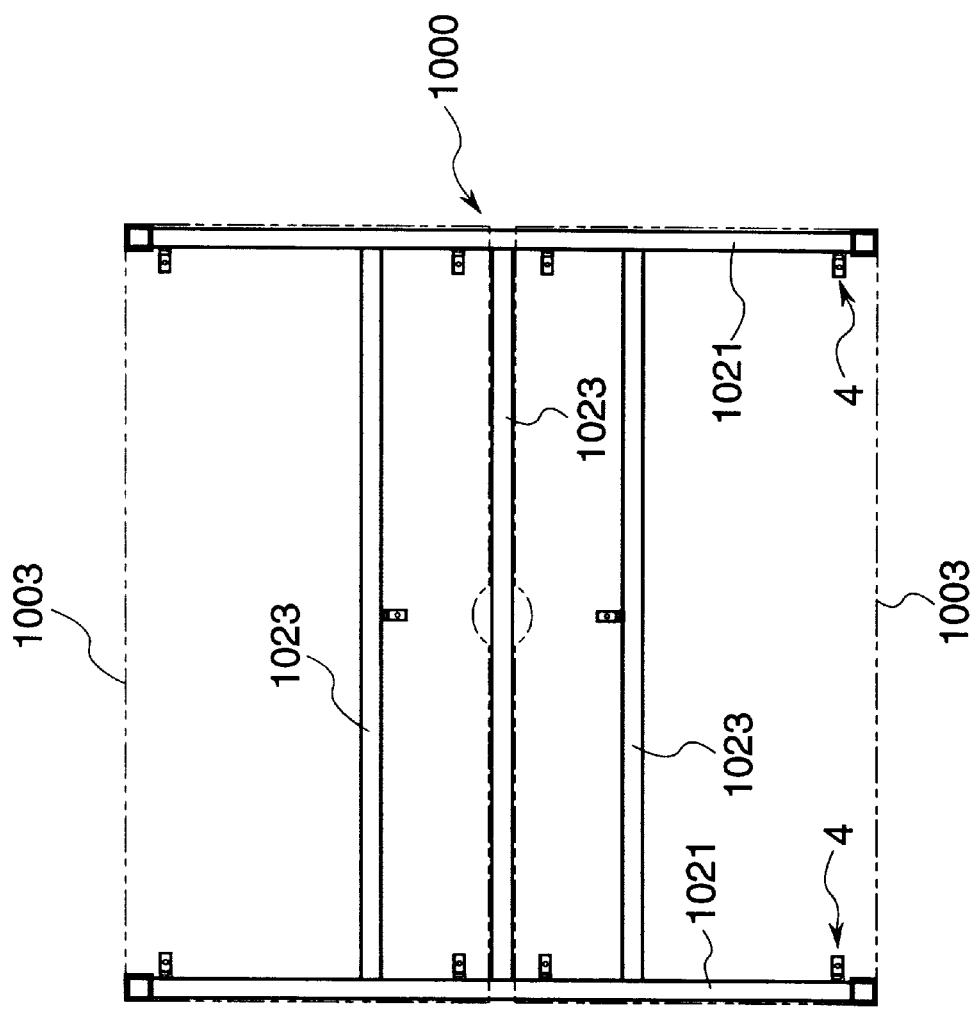
FIG. 19 is a plane view showing a modified form of the frame and which corresponds to FIG. 3.
Figure 20:
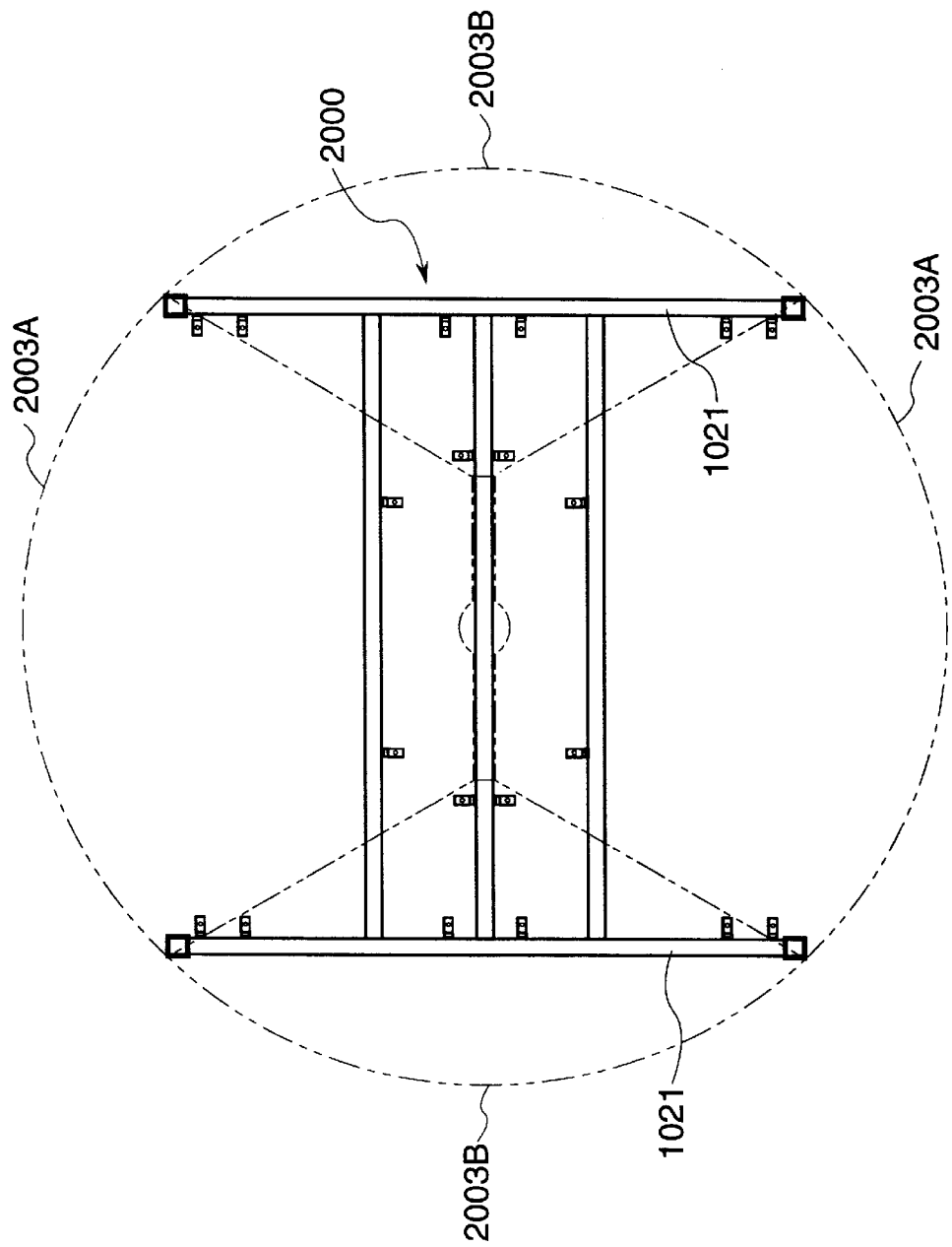
FIG. 20 is a plane view showing a modified form of the frame and which corresponds to FIG. 3.

The component parts are not limited to the illustrated constructions, but there may be various modifications and changes without departing from the scope of the invention. For example, if a frame 1000 comprises right and left side frame members 1021 and three reinforcing frame members 1023 arranged therebetween, two top plates 1003 are placed on the frame 1000 with a predetermined interval provided and the mounting members 4 can be mounted on the frame members 1021, 1023 at an option by making use of rail grooves, as shown in FIG. 19, the same effect can be obtained as the above embodiment. FIG. 20 shows an example as a modified form wherein two pairs of odd-shaped top plates 2003A, 2003B are mounted on the frame 1000 so as to form a circle table. Further, the desk described in this specification also includes a concept of, so to speak, a table.

Next, as another embodiment a desk to which an electrical outlet mounting unit as a modified form of a mounting member for mounting an electrical outlet is applied will be shown.

Conventionally electrical outlets in the market are substantially standardized for the convenience of both manufacturers and users. Although the electrical outlets are standardized, a plurality of different standards exist or the standard varies in countries. In addition to this situation, office machines placed on a top plate of a desk are getting increased due to rapid progress in office automation or internationalization which requires a variety of outlets and which diversifies a utilizing form of the outlets.

In view of the above trend, however, it is conventionally unavoidable that an outlet holder is newly developed individually to meet the above specification or a requirement in variety of sizes due to producing countries. There is fear of the above mentioned outlet holder unable to flexibly cooperate with the outlet which is getting diversified more and more.

In order to solve the above problems, the embodiment is to provide a desk to which an electrical outlet mounting unit which makes it possible to mount an electrical outlet of variety of sizes is applied.

More specifically, in this embodiment, an electrical outlet mounting unit which comprises a base provided with a mounting portion along a certain direction and a pair of outlet holders which can be mounted at a position on the mounting portion of the base with a relative distance between the outlet holders variable, and which is so arranged that it can hold an electrical outlet between the outlet holders is applied to the desk.

In accordance with the arrangement, if a distance between the outlet holders is varied according to a width of the electrical outlet, it can effectively deal with an electrical outlet of variety of sizes. As a result, the outlet holder can mount an outlet of different sizes having a plurality of specifications or produced in various countries, which will increase a possibility that the outlet holder can deal with the outlet which is likely to be varied more and more in future.

In this case, it is preferable that both of the outlet holders have an elastically deformable clipping face for holding outlets at the position facing each other.

The outlet holder may comprise a bracket and a resin member which is held by the bracket wherein a face for clipping an outlet is arranged at a part of the resin member.

In this case, for mounting the outlet securely on the base it is preferable that the face for clipping the outlet is tapered so as to push the outlet against the base.

The mounting portion may be a rail groove which is provided on the base and which is made to open continuously wherein the base side of the outlet holder makes an engagement with the rail groove.

In the preferable arrangement of mounting the outlet holder, the outlet holder may be so arranged that it can be mounted by using a liner member arranged base end of the outlet holder and a screw passing through the outlet holder which is helically connected with the liner member wherein the outlet holder is fixed by steps of arranging the base end of the outlet holder affixed to the outer face of the base, arranging the liner member affixed to an inner face of the base in the rail groove, and with this condition kept, helically connecting the screw which passes through the outlet holder with the liner member so that a part of the base can be held between the outlet holder and the liner member.

For making it easy to insert the liner member into the rail groove, it is preferable that the liner member is so arranged that it can pass through the rail groove and can be rotated at a predetermined angle so as to make an abutting contact with two positions each falls on the inner faces of the upper and lower base respectively after passing over the rail groove.

The base may be represented by that the base is a constructing element of a furniture comprising a top plate.

In addition, the constructing element of the furniture comprising a top plate may preferably be a frame which constitutes a top plate supporting member.

Figure 21:
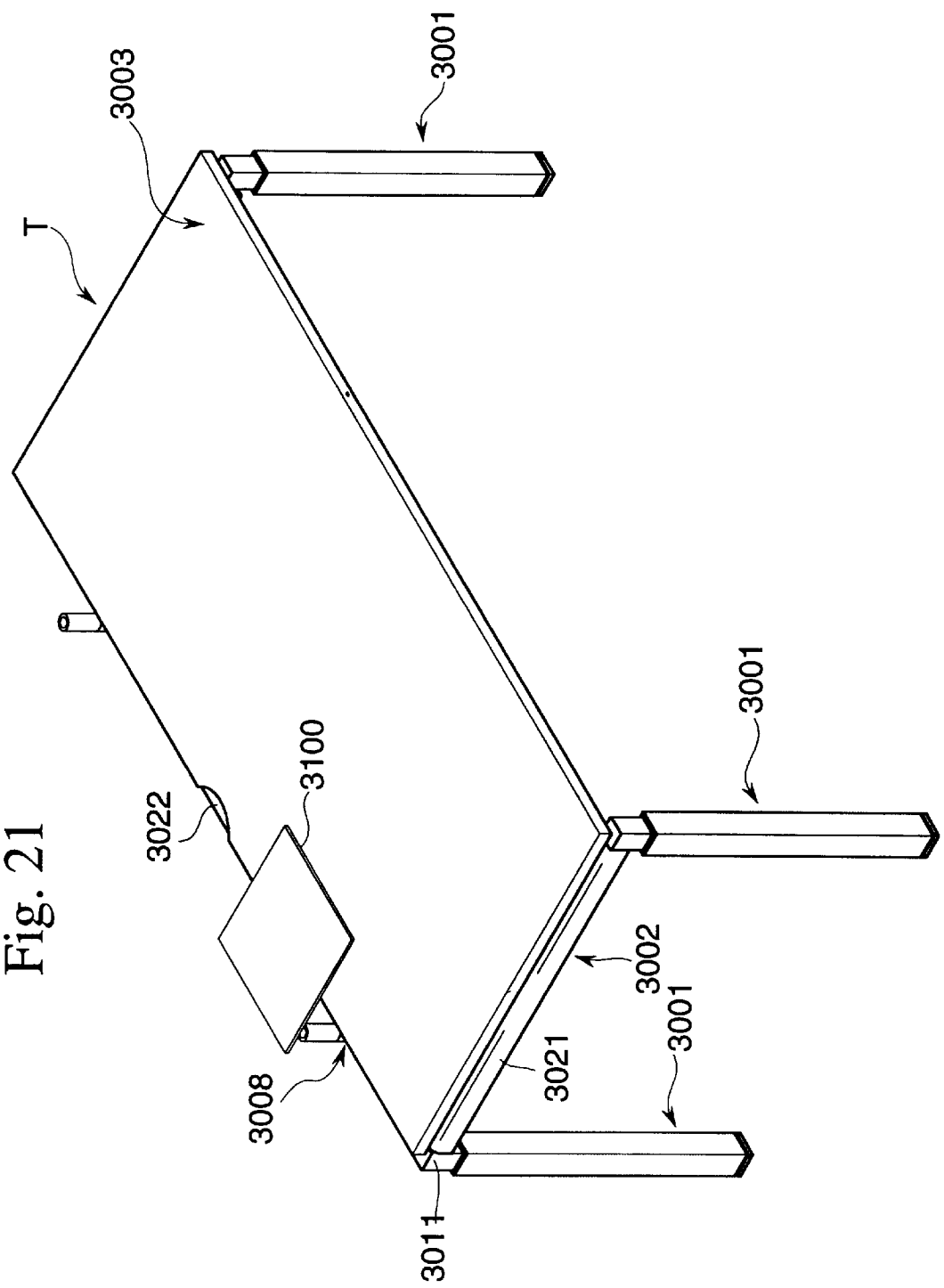
FIG. 21 is a perspective view showing another embodiment of the invention which is applied to a modified form of an electrical outlet.
Figure 22:
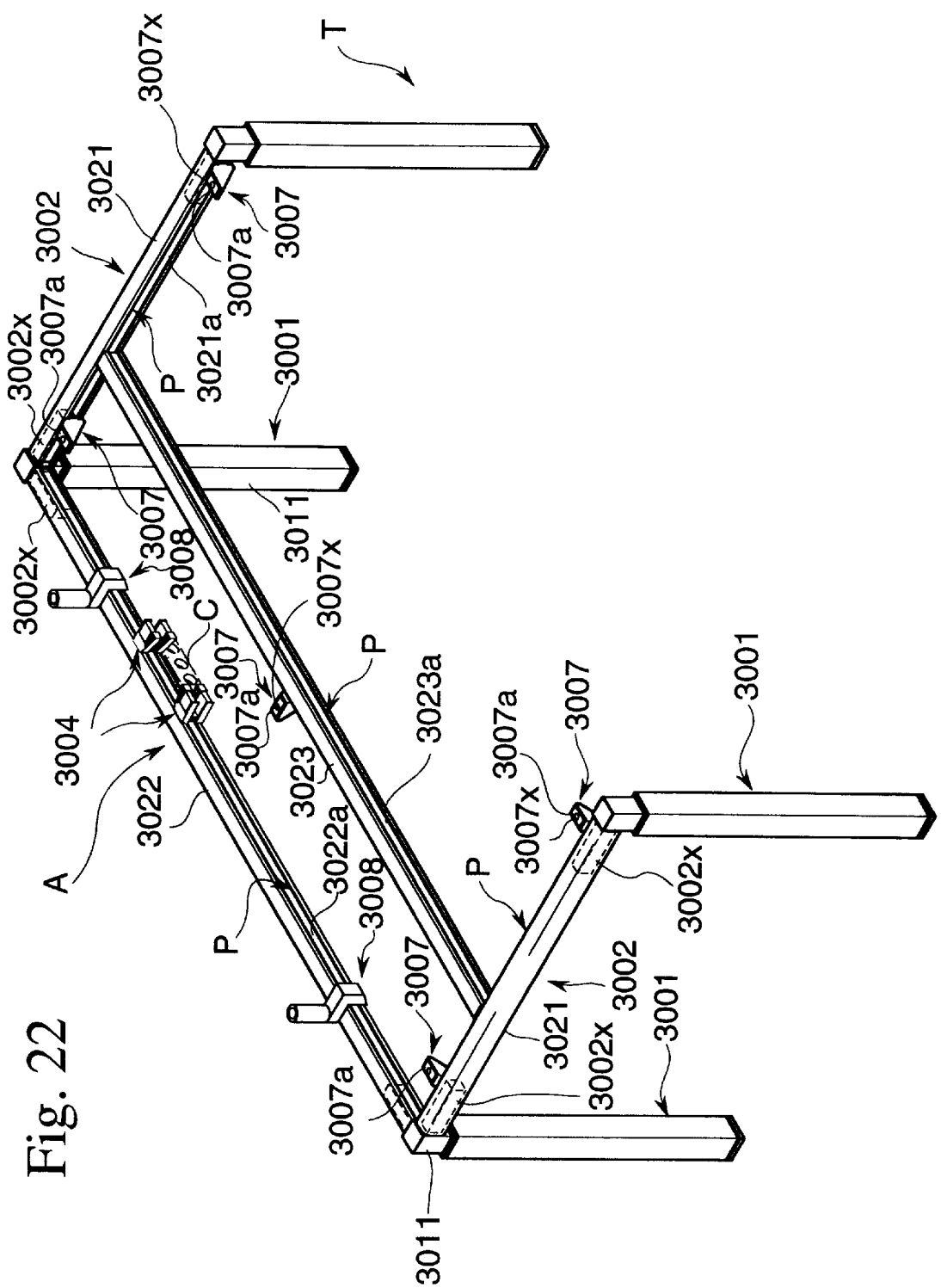
FIG. 22 is a perspective view of the embodiment wherein a top plate is omitted to draw.
Figure 23:
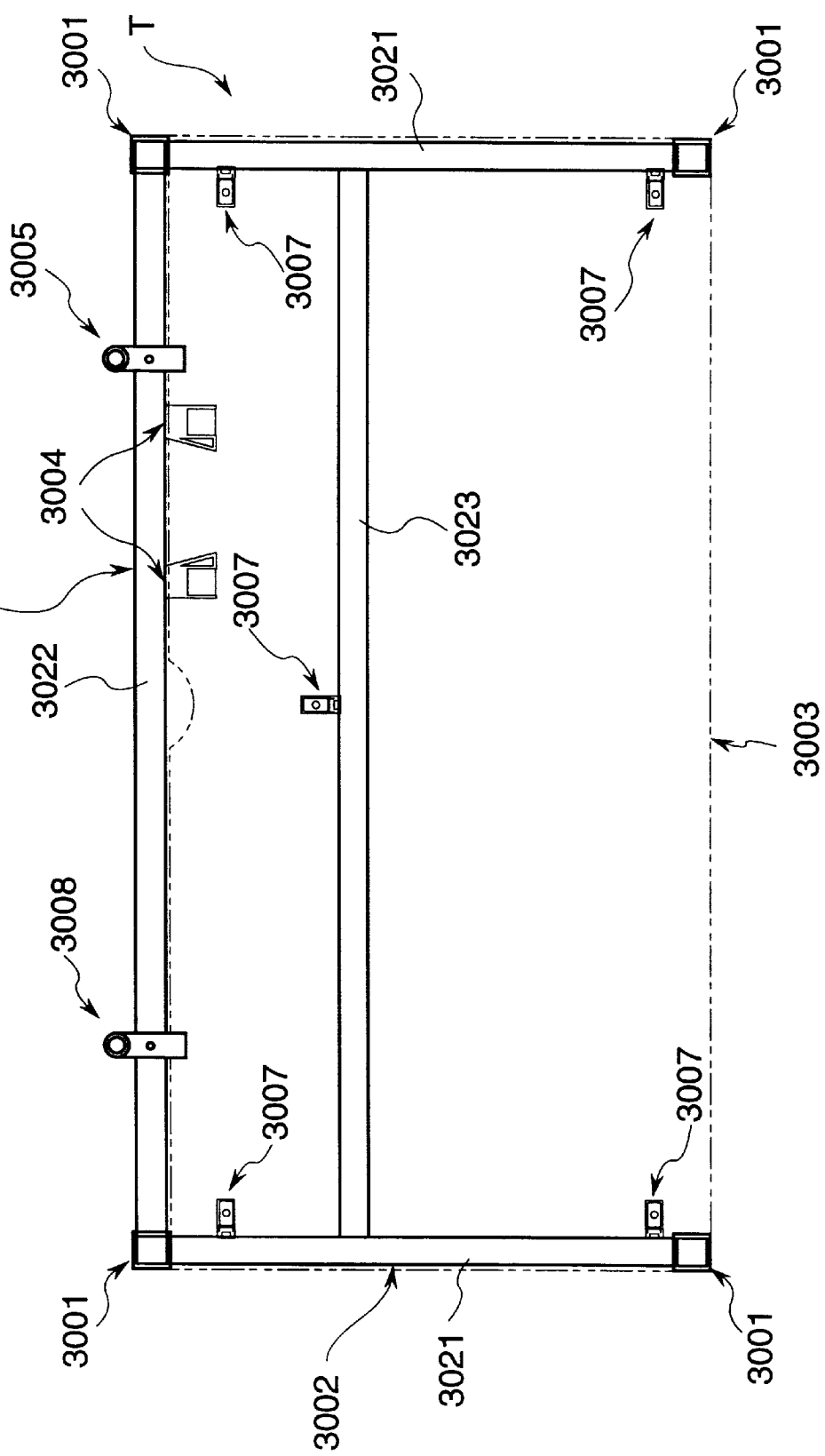
FIG. 23 is a plane view of the embodiment with the top plate drawn in imaginary lines.

More concrete case will be described in which an electrical outlet mounting unit A is applied to a desk T as shown in FIGS. 21 through 23.

The desk T has an arrangement that each of four leg support posts 3001 is connected at the upper end thereof through a frame 3002 and a top plate 3003 is supported by the frame 3002.

Each of the leg support posts 3001 is of a square pipe and arranged at four corners or near the corners of the rectangular top plate 3003 with an upper end of the leg support post 3001 facing to an underside of the top plate 3003. The frame 3002 comprises a pair of side frame members 3021 which connect the front and back leg support posts 3001 at adjacency of the top end of the inner surfaces which face each other along a direction of depth, a front frame member 3022 which connects the side leg support posts 3001 arranged front side at adjacency of the top end of the inner surfaces which face each other along a direction of width, and reinforcing frame member 3023 which connects the side frame members 3021 at a little front of the center of the inner surfaces which face each other. This frame 3002 constitutes a self standing structure together with each of the leg support posts 3001 by prohibiting each other from being apart.

Each of the side frame members 3021 and the front frame member 3022 is made of an extruded form of a material having rigidity such as aluminum which is cut in a required length and has an isometric cross-section as shown in FIG.

24. As shown in the cross-section, each of the side frame members 3021 and the front frame members 3022 has a top wall 3002a, a bottom wall 3002b, a side walls 3002c and two inner walls 2d which divide the side walls 3002c so as to constitute a square pipe. A hollow portion 3002e surrounded by the top wall 3002a, the bottom wall 3002b and the side walls 3002c is a space to mount the frame members 3021, 3022 on the leg support post 3001. The frame members 3021, 3022 and the leg support posts 3001 are connected through an arm 3002x which is shown in imaginary lines in FIG. 22 by steps of previously mounting the arm 3002x on a wall face of the leg support post 3001, fitting whole of the frame members 3021, 3022 over the arm 3002x by inserting the arm 3002x into the hollow portion 3002e and tightening a screw at a required position.

Figure 25:
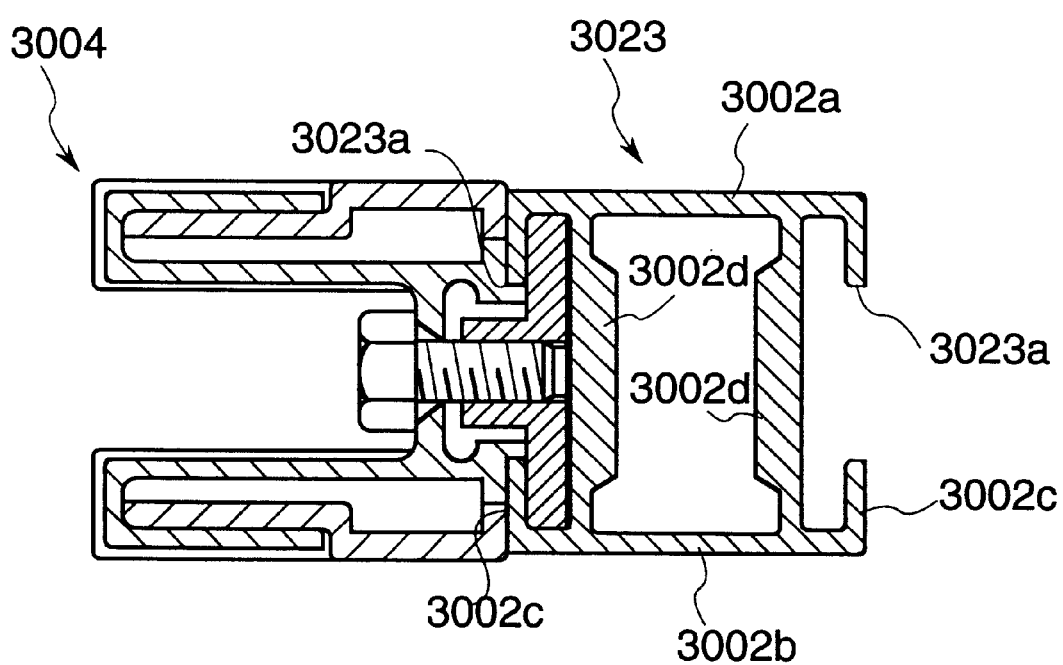
FIG. 25 is a partially magnified cross-sectional view of the reinforcing frame member of the embodiment.

The reinforcing frame member 3023 is, as shown in FIG. 25, also made of an extruded form of a material having rigidity such as aluminum which is cut in a required length and has substantially the same top wall 3002a, a bottom wall 3002b, a side walls 3002c and inner walls 3002d.

In addition, when the frame members 3021, 3022 are excluded, a rail groove 3021a, 3022a which has an opening extending longitudinally and continuously is provided at the center of one of the side walls 3002c of the frame members 3021, 3022. The reinforcing frame member 3023 is provided with a rail groove 3023a which has an opening extending longitudinally and continuously at the center of both of the side walls 3002c.

The top plate 3003 is fixed to the side frame members 3021 and the reinforcing frame member 3023 by steps of fixing five pieces of the mounting members 3007 to the front and back positions of each of the side frame members 3021 and the center of the reinforcing frame member 3023, placing the top plate 3003 on the mounting face 3007a of the mounting members 3007 and screwing a screw from underside of the top plate 3003 through a through hole 3007x which is provided at the mounting surface 3007a.

Figure 26:
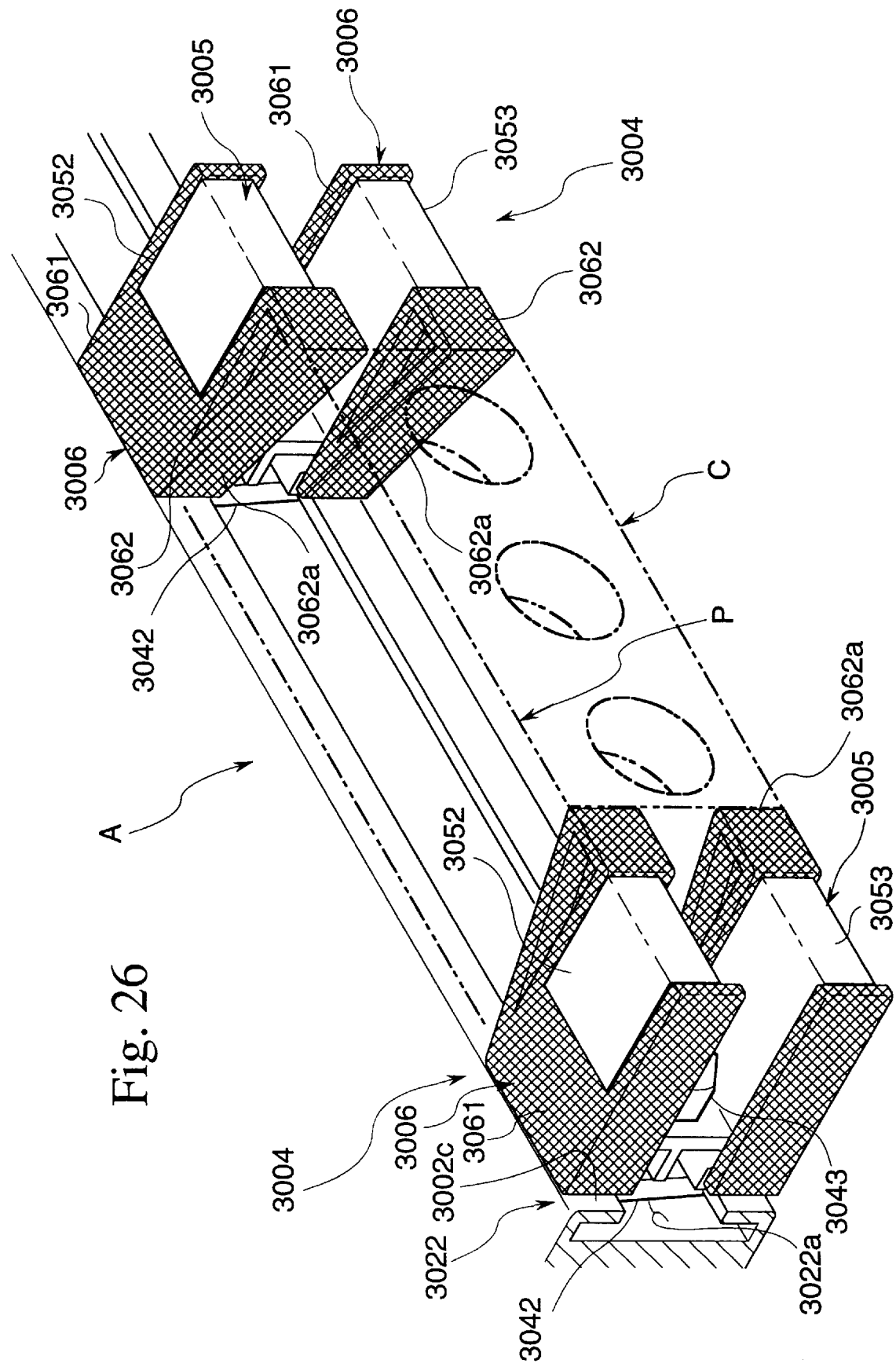
FIG. 26 is a partially cut-out perspective view of the outlet folder.

In the above arrangement, the electrical outlet mounting unit A of this embodiment, as shown in FIG. 22, is so constructed that the rail grooves 3021a, 3022a, 3023a of the side frame members 3021, the front frame member 3022 and the reinforcing frame member 3023, serve as a continuous mounting portion P, a pair of outlet holders 3004 are mounted as shown in FIG. 26 and the electrical outlet C can held between the outlet holders 3004. A case in which the outlet holders 3004 is mounted on the front frame member 3022 will now be explained with referring to FIG. 24 and FIGS. 26 through 29. FIGS. 28 and 29 show an arrangement of the outlet holder 3004 mounted on the mounting portion P, however, a resin member 3006 is omitted to draw in order to clarify the arrangement.

The outlet holder 3004 comprises a bracket 3005, the resin member 3006 which is held by the bracket 3005 and can be mounted on the front frame member 3022 by means of the liner member 3042 which is arranged on a base side of the bracket 3005 and a screw 3042 which helically connects the liner member 3042 after passing through the bracket 3005.

Figure 24:
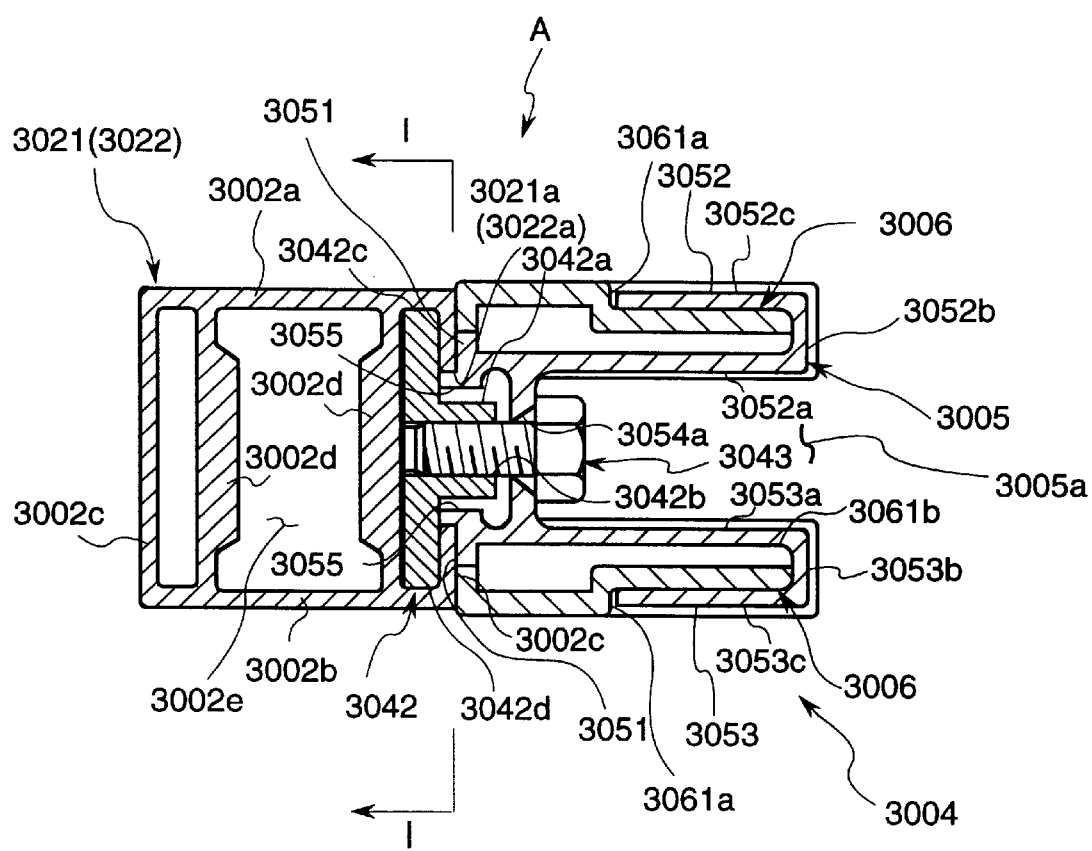
FIG. 24 is a partially magnified cross-sectional view of the side frame member (front frame member) of the embodiment.
Figure 27:
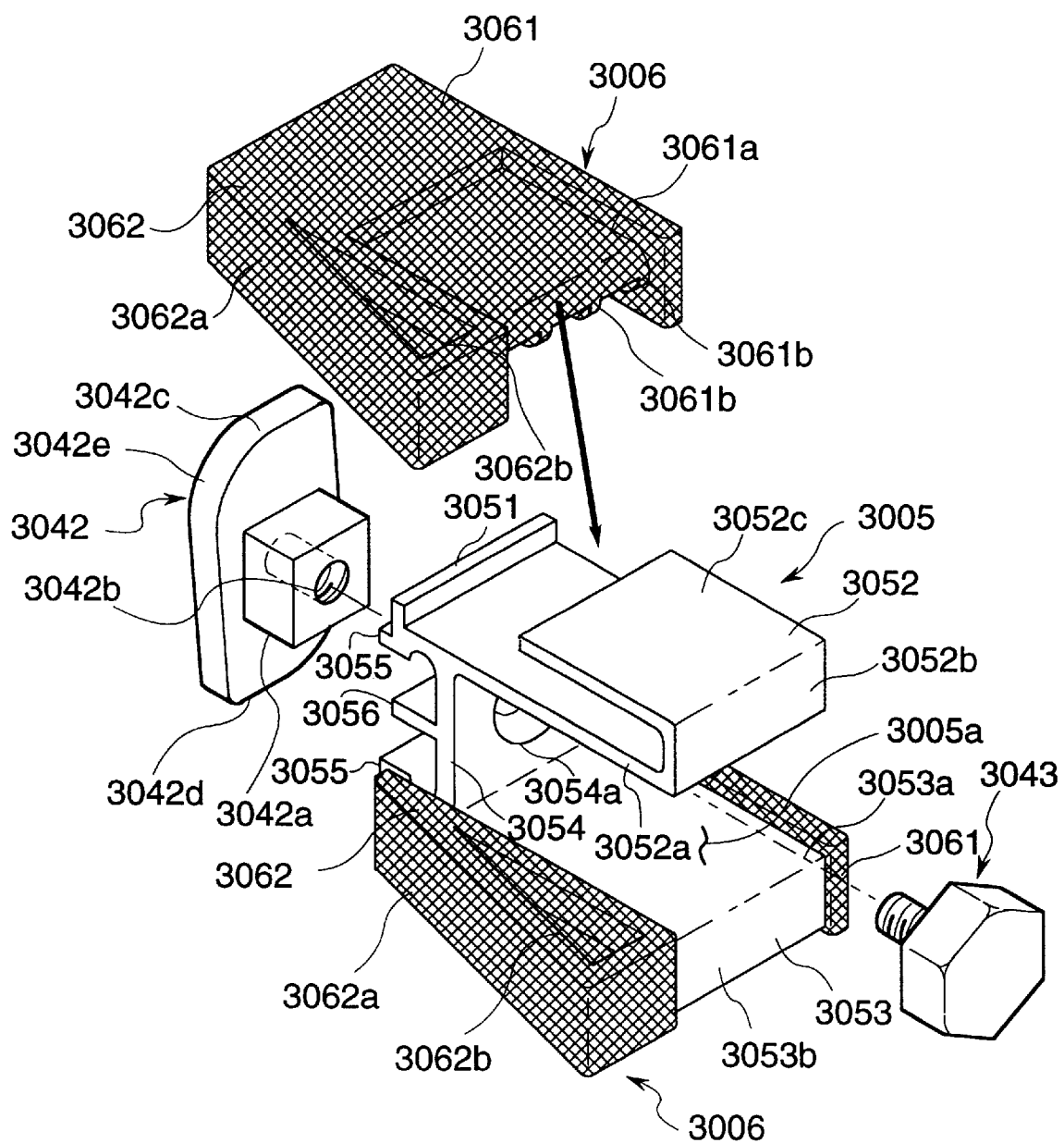
FIG. 27 is an exploded perspective view of the outlet folder.
Figure 28:
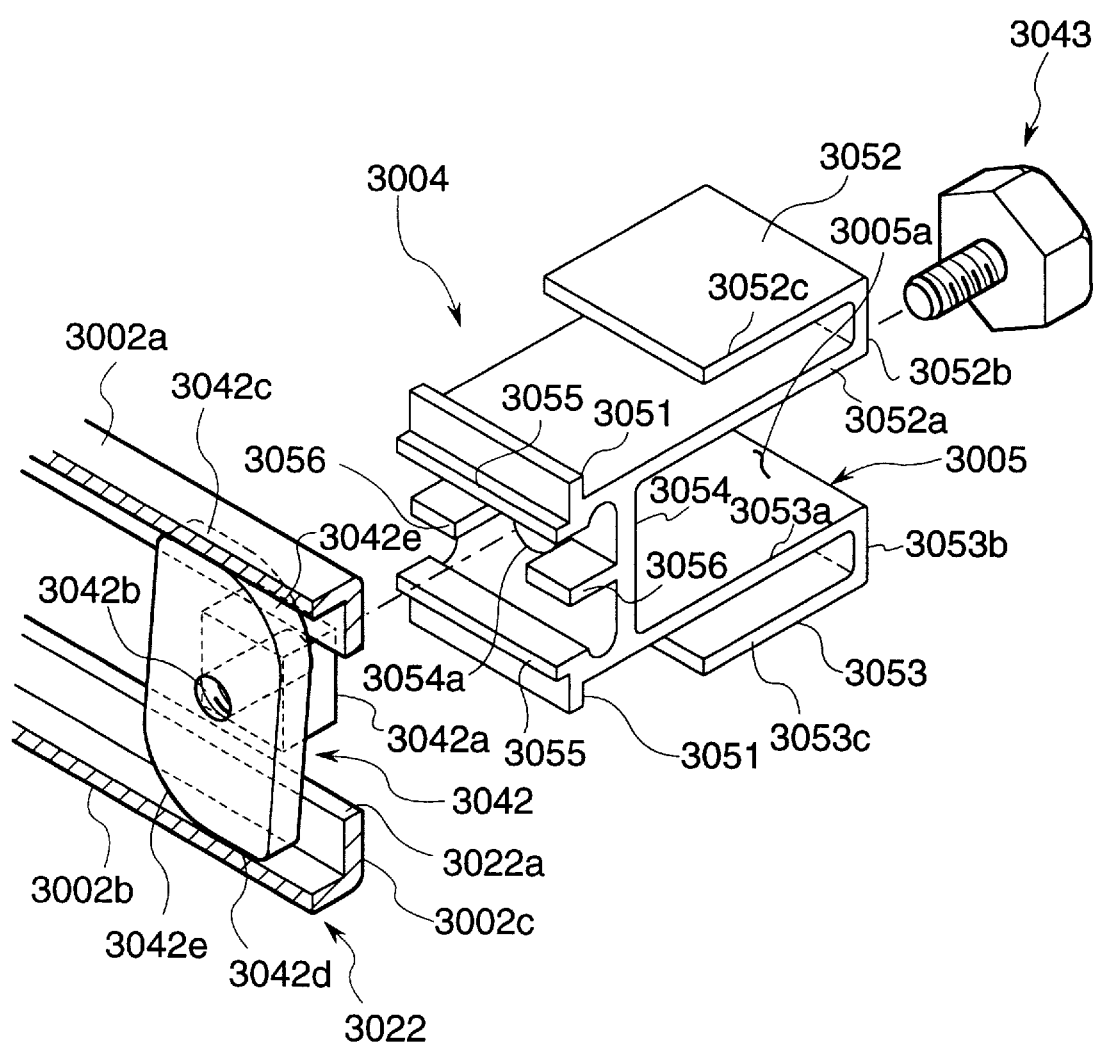
FIG. 28 is a partially cut-out perspective view of the arrangement of mounting the electrical outlet folder of the embodiment.
Figure 29:
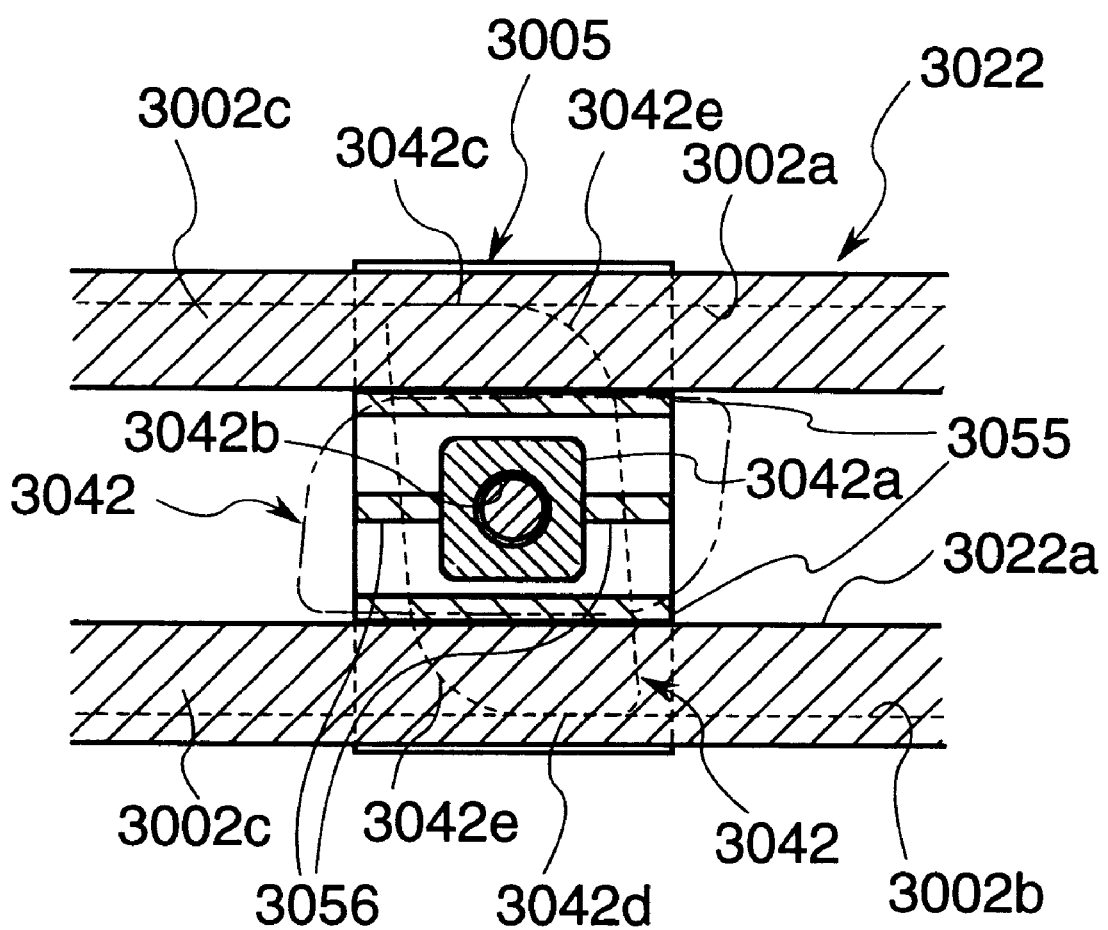
FIG. 29 is a cross-sectional view taken along the line I—I in FIG. 24.

The bracket 3005 is made of a rigid material such as aluminum formed by means of extrusion and comprises, as shown in FIG. 24 and FIGS. 27 and 28, base end wall portions 3051 which are arranged vertically in pairs and which make an abutting contact with the side wall 3002c, upper and lower retaining portions 3052, 3053 which hold the resin member 3006 by projecting from the outer side face of the base end wall portion 3051, a center wall 3054 which has a through hole 3054a and which connects the upper and the lower retaining portions 3052, 3053, first engaging projections 3055 which project from the inner side face of the base end wall portion 3051 and which are arranged in pairs vertically, second engaging projections 3056 which project from the inner side face of the center wall 3054 and which are arranged horizontally in pairs along right and left.

The upper retaining portion 3052 is generally a channel shape in longitudinal cross-section and comprises a lower level wall 3052a which projects horizontally from adjacency of the lower end of the upper base end wall portion 3051, an upright wall 3052b which projects vertically from a projecting end of the lower level wall 3052a and an upper level wall 3052c which extends from the upper end of the upright wall 3052b toward the base end wall portion 3051 horizontally to a position beyond a little the longitudinal center of the lower level wall 3052a. The lower retaining portion 3053 is generally a channel shape in longitudinal cross-section and comprises an upper level wall 3053a which projects horizontally from adjacency of the upper end of the lower base end wall portion 3051, an hanging wall 3053b which hangs down vertically from a projecting end of the upper level wall 3053a and a lower level wall 3053c which extends from the lower end of the hanging wall 3053b toward the base end wall portion 3051 horizontally to a position beyond a little the longitudinal center of the upper level wall 3053a. The bracket 3005 is provided with a concave portion 3005a so as to have an opening toward side and the use's side between the upper and lower retaining portions 3052 and 3053.

The first engaging projection 3055 is so formed that it can be inserted into an opening of the rail groove 3022a of the front frame member 3022 and it can fit over the fitting projection 3042a which projects from the liner member 3042 by means of the first engaging projections 3055 and the second engaging projections 3056.

The resin members 3006 are arranged in pairs and made of synthetic resin such as elastomers and each of the resin members 3006 is held by the upper and lower retaining portions 3052, 3053 of the bracket 3005. The resin members 3006 comprises a body 3061 and a projecting portion 3062 whose plane view is a triangle and which projects from the body 3061. The resin members 3006 are mounted on the bracket 3005 with the base end wall portion 3051 of the bracket 3005 engaged with a concave groove, not shown in drawings, and which is arranged in a surface facing the bracket 3005 and with the concave portion 3061a engaged with the upper level wall 3052c or the lower level wall 3053c by making use of the concave and the convex, and the upper surface of the resin member 3006 projects upper side a little from the upper retaining portion 3052 and the lower surface of the resin member 3006 projects downside a little from the lower retaining portion 3053. On the surface of the body 3061 facing the bracket 3005 provided are a plurality of ribs 3061b, which elastically transform when the body 3061 is inserted into the upper and lower retaining portions 3052, 3053, thereby to make it smooth that the concave portion 3061a makes an concave and convex engagement with the upper level wall 3052c or the lower level wall 3053c. In the resin member 3006, a concave portion 3062b whose plane view is triangle is provided on the upper and under surfaces of the projecting portion 3062 and further provided is a tapered face 3062a as an outlet clipping face which transforms a part of a clipping force in clipping an electrical outlet C into a force which pushes the electrical outlet C against the front frame member 3022.

The liner member 3042 has a shape of general parallelogram and at the center thereof provided is a fitting projection 3042a which fits into a space between the first and the second engaging projections 3055, 3056 of the bracket 3005 and a threaded hole 3042b is threaded at the center of the fitting projection 3042a so that a screw 3043 can be helically connected therewith. The least distance between the upper side 3042c and the base side 3042d of the liner member 3042 generally corresponds to the interior measurement between the upper wall 3002a and the base wall 3002b and the upper right hand half of the upper side 3042c and the lower left hand half of the base side 3042d are formed to have a radius surface 3042e whose axis coincides with that of the threaded hole 3042b.

More specifically, the whole of the outlet holder 3004 can be fixed by steps of arranging the base wall 3041a affixed to the outer face of the side wall 3002c and the liner member 3042 affixed to the inner face of the side wall 3002c in the rail groove 3022a with the first engaging projection 3055 of the bracket 3005 engaged with the opening of the rail groove 3022a, with keeping the condition pulling the liner member 3042 closer to the bracket 3005 by helically connecting the screw 3043 which has passed through the bracket 3005 with the liner member 3042 so as to hold the side wall 2c between the bracket 3005 and liner member 3042. The liner member 3042 has an arrangement that it can pass through an opening of the rail groove 3022a with a condition as shown in imaginary lines in FIG. 29, then can be rotated at a predetermined angle so as to make an abutting contact with a position which extends over the inner faces of the upper and lower side walls 3002c after passing over the rail groove 3022a and the upper side 3042c and the base side 3042d can make an abutting contact with each of the inner faces of the upper wall 3002a and the base wall 3002b of the front frame members 3022 at a predetermined position. The radius surface 3042e is formed to avoid interference when the liner member 3042 is rotated. As mentioned above, the outlet holders 3004 are mounted on the rail groove 3022a in a pair so as to hold the electrical outlet C between the resin members 3006 of the outlet holders 3004. As mentioned above, the resin member 3006 is provided with the tapered face 3062a so as to stabilize a condition in which the electrical outlet C is mounted by transforming a part of the holding force into a force which pushes the electrical outlet C against the front frame member 3022 when the electrical outlet C is held.

A method for mounting the outlet holder 3004 on the front frame member 3022 is described in the above, however, the outlet holder 3004 can be mounted on the longitudinal center of the rail groove 3021a, 3023a of the side frame member 3021 and the reinforcing frame member 3023 also in the same manner and the arrangement of mounting the bracket 3005 which constitutes the outlet holder 3004 on the rail groove 3021a, 3023a is the same as that on the rail groove 3022a.

In accordance with the arrangement, if a distance between a pair of the outlet holders 3004 is varied in accordance with a width of the electrical outlet C, the outlet holders 3004 can mount an electrical outlet C of a variety of sizes. As a result, the outlet holder can mount the electrical outlet C of different sizes having a plurality of specifications or produced in various countries, which will increase a possibility that the outlet holders 3004 can deal with the electrical outlet C which is likely to be varied more and more in future.

Further, since each of the outlet holders 3004 comprises the tapered face 3062a which holds the electrical outlet C and the outlet holder 3004 is elastically deformable, the outlet holder 3004 can hold the electrical outlet C by making use of elastic deformation of the outlet holder 3004 without causing damaged to the electrical outlet C.

Since the outlet holder 3004 comprises the bracket 3005 and the resin member 3006 which is held by the bracket 3005, and the tapered face 3062a holding the electrical outlet C is arranged on a part of the resin member 3006, a certain strength can be expected in mounting the electrical outlet C and the electrical outlet C can be held suitably by making use of elastic deformation of the resin member 3006 without causing damaged to the electrical outlet C if the bracket 3005 is rigid and made of aluminum like this embodiment.

In addition, since the surface holding the electrical outlet C is made to be the tapered face 3062a which functions so as to push the electrical outlet C against the frame members 3021, 3022, 3023, a condition in which the electrical outlet C is mounted can be by fur improved and secured.

Especially, in this embodiment, since the continuous mounting portion P for mounting the outlet holder 3004 on an appropriate position is so formed that the rail groove 3021a, 3022a, 3023a is provided to have an opening on the side wall 3002c as an upright wall of the frame members 3021, 3022, 3023 and the base end of the outlet holder 3004 is so made that it can make an engagement with the rail groove 3021, 3022a, 3023a for mounting the outlet holder 3004, the mounting portion P can be manufactured with ease by means of extrusion and an extremely improved condition in which the outlet holder 3004 is mounted can be secured.

Since the outlet holder 3004 comprises the liner member 3042 which is arranged at the base end of the bracket 3005 and the screw 3043 helically connected with the liner member 3042 after passing through the bracket 3005, and whole of the outlet holder 3004 can be fixed by steps of arranging the base end of the bracket 3005 affixed to an outer face of the side wall 3002c, arranging the liner member 3042 affixed to an inner face of the side wall 3002c in the rail groove 3021a, and with this condition kept, helically connecting the screw 3043 which has passed through the bracket 3005 with the liner member 3043 so that the side wall 3002c can be held by the bracket 3005 and the liner member 3042, the outlet holder 3004 can be mounted or dismounted with ease and a position at which the outlet holder 3004 is mounted can be selected optionally.

Further, since the liner member 3042 makes an abutting contact with two position each falls on the upper and lower side walls 3002c respectively after passing over the rail groove 3021a by steps of passing through an opening of the rail groove 3021a then being rotated at a predetermined angle, the liner member 3042 can be inserted into the rail groove 3021a with ease and can be fixed on a predetermined position without fail after inserted.

Figure 30:
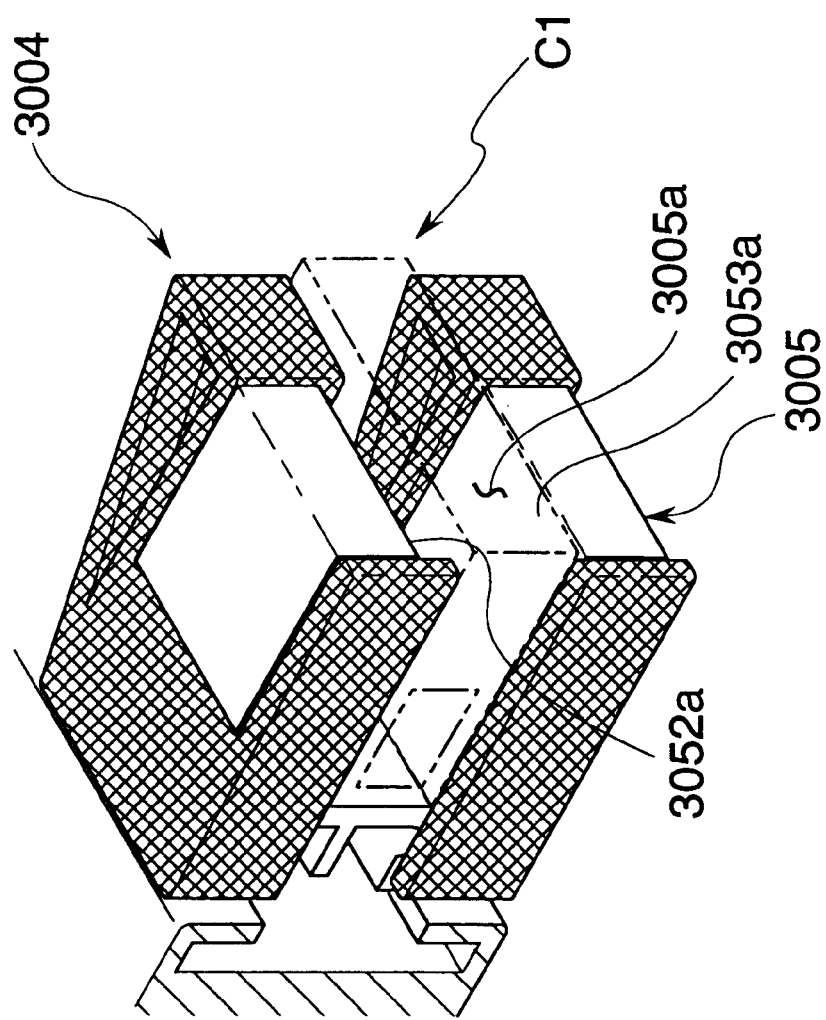
FIG. 30 is a perspective view showing a condition wherein the information outlet is mounted on the outlet folder.

The electrical outlet C in this specification is not limited to an electrical outlet but may include a communication outlet. Especially, it is a matter of course that a small-sized communication outlet C1 can be held between a pair of outlet holders 3004 as described above, however, it can be held, as shown in FIG. 30, by being pushed a little into the concave portion 3005a of the bracket 3005. In this case, since the surfaces which face each other of the upper and the lower resin members 3006 are arranged so as to project from the upper and the lower level walls 3032a, 3053a, the communication outlet C1 can be held by the upper and the lower resin members 3006. As a result, the communication outlet C1 can be mounted without causing damaged.

In addition to the above, since the frame 3002 of this embodiment comprises the right and left side frame members 3021, the front frame member 3022 which connects the side frame members 3021 at the front end thereof and the reinforcing frame member 3023 which connects the side frame members 3021 at the center thereof wherein the frame members 3021, 3022, 3023 are provided with the rail grooves 3021*a*, 3022*a*, 3023*a* having isometric or generally isometric cross-section, the frame 3002 can be manufactured with ease by means of extrusion and the degree of freedom in selecting a portion for mounting the outlet holder 3004 can be increased by far. Especially, the reinforcing frame member 3023 is provided with the rail groove 3023*a* at both sides, thereby to increase further the degree of freedom in selecting a portion for mounting the outlet holder 3004.

Figure 31:
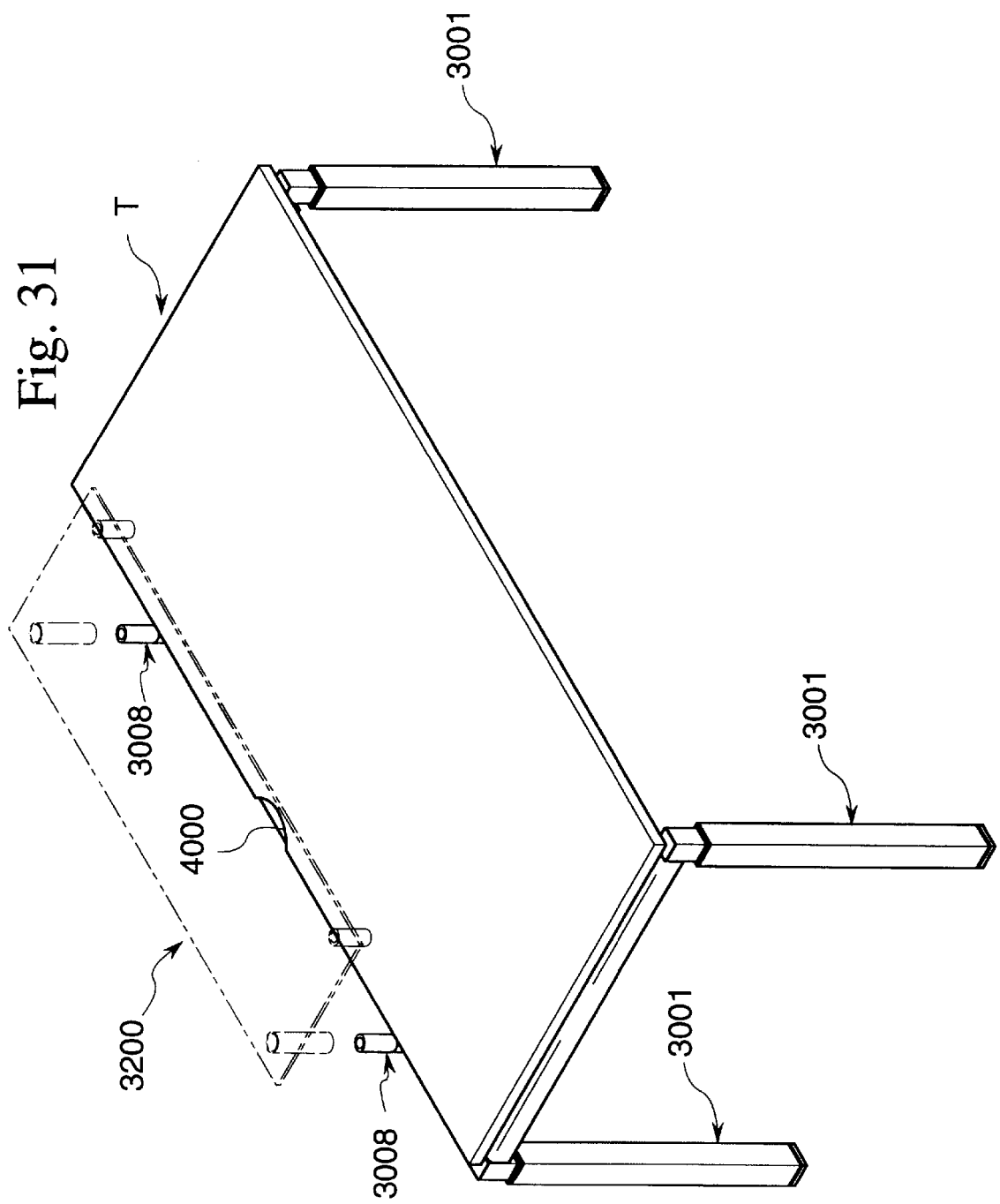
FIG. 31 is a perspective view showing a condition wherein the auxiliary top plate is mounted on the desk of the embodiment.
Figure 32:
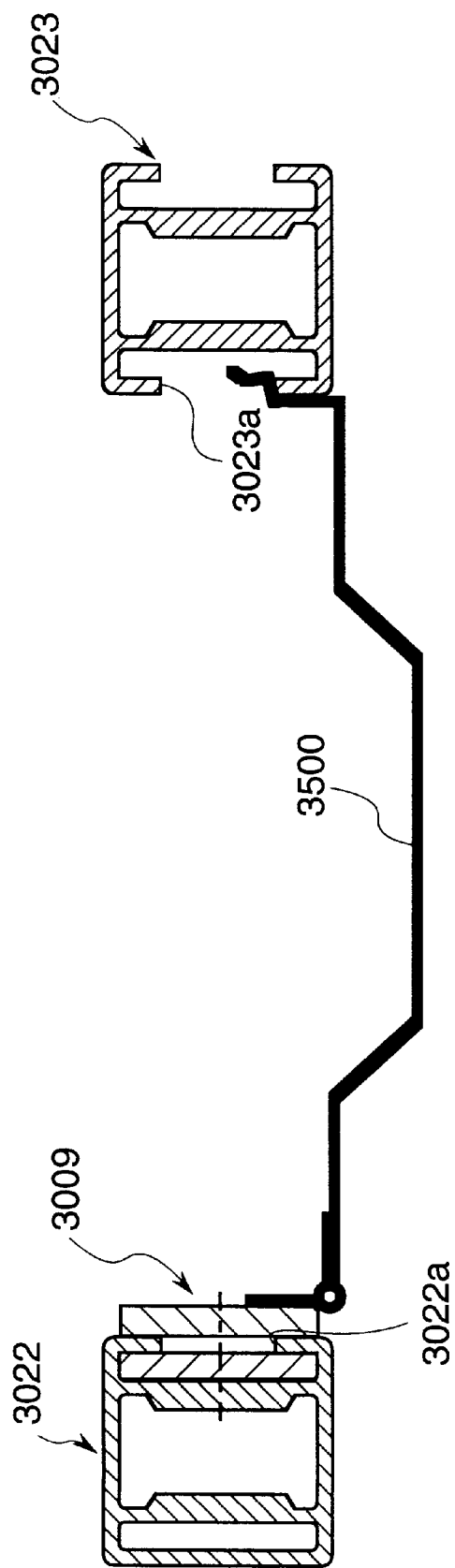
FIG. 32 is a perspective view showing a condition wherein the cable containing duct is mounted on the desk of the embodiment.

In the desk T of this embodiment, the mounting member 3007 for top plates and mounting members 3008 and 3009 are mounted on the rail grooves 3021*a*, 3022*a*, 3023*a* of the side frame members 3021, the front frame member 3022 and the reinforcing frame member 3023, and the top plate 3003 is mounted through the mounting member 3007 for top plates, a stand 3100 such as a telephone stand, as shown in FIG. 21, or an auxiliary top plate 3200, as shown in FIG. 31, is mounted through the mounting members 3008, various optional components such as a cable-containing duct 3500, as shown in FIG. 32, is mounted through the mounting member 3009 and the reinforcing frame member 3023 is also mounted by making use of the rail groove 3021*a* of the side frame member 3021.

Figure 33:
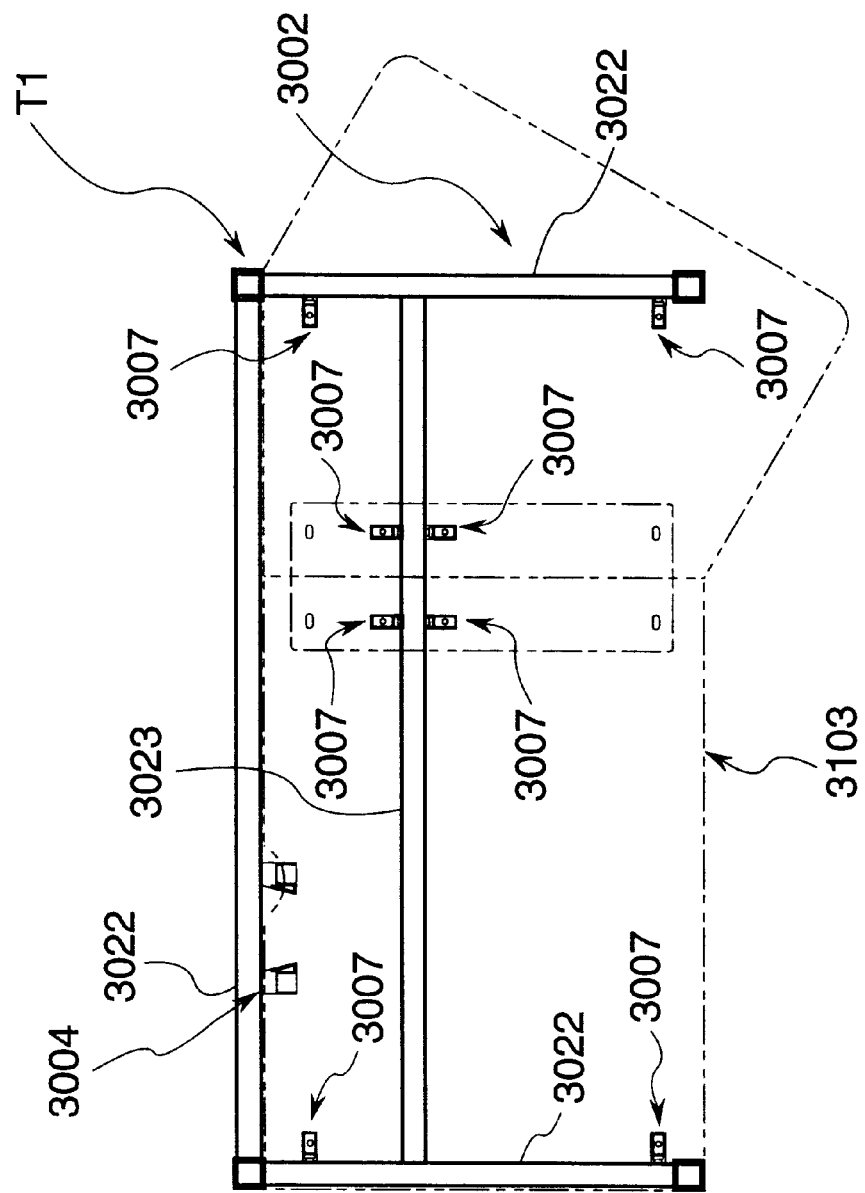
FIG. 33 is a plane view showing a condition wherein the outlet folder is mounted on a desk having an odd-shaped top plate.

For a desk T1 having an odd-shaped top plate 3103 as shown in FIG. 33, a position at which the optional components such as the stand 3100, the auxiliary top plate 3200, the cable-containing duct 3500 are to be mounted can be optionally changed as well as that of the electrical outlet C if a position at which the outlet holder 3004, the mounting member 3007 for top plates and the mounting members 3008, 3009 are mounted is changed. As a result, even if there is a necessity for changing a position at which a top plate is supported and an accompanying necessity for changing a position at which the electrical outlet C or optional components are mounted, it can be done just by changing a position at which the mounting members 3007, 3008, 3009 for mounting the outlet holder 3004 or optional components. As a result, there is no need of designing or manufacturing a frame one by one to meet a specification of a top plate.

Figure 34:
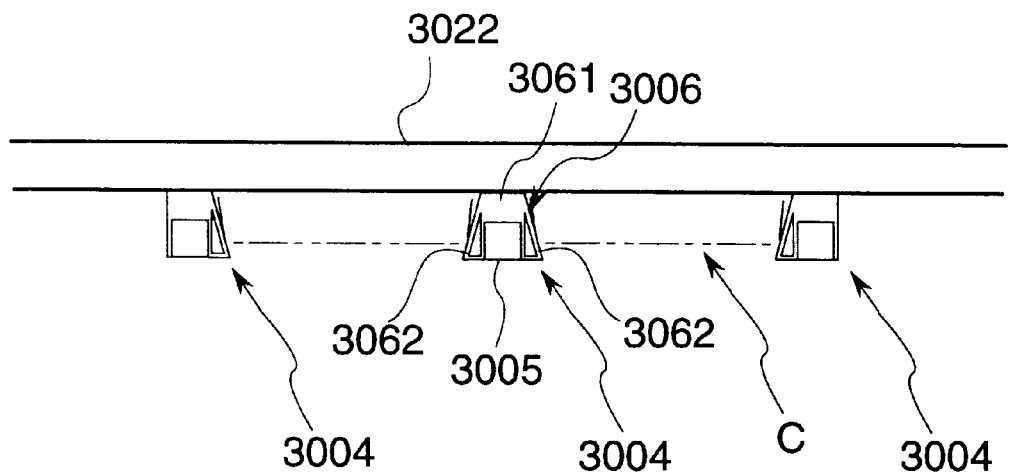
FIG. 34 is a plane view showing another method of using the outlet folder.

The arrangement of the component parts are not limited to the illustrated constructions. For example, the mounting portion P is not limited to the rail groove 3021*a*, 3022*a*, 3023*a* like this embodiment, but may be the one in which a plurality of threaded holes are intermittently provided on a frame member and a screw which has passed through the outlet holder 3004 is helically connected with the threaded hole so as to mount the outlet holder 3004 on the frame member. In addition, in this embodiment, the resin member 3006 has the projecting portion 3062 at one side of the body 3061 projecting from the bracket 3005, however, the projecting portion 3062 may be provided at both sides of the body 3061 and can be used as shown in FIG. 34. There may be various modifications and and changes in other arrangement without departing from the scope of the invention. Further, the desk described in this specification also includes a concept of, so to speak, a table.

It is not limited to a desk that this electrical outlet mounting unit A is applied to.

The electrical outlet mounting unit A of this embodiment produces following effects.

Since the electrical outlet mounting unit comprises the base which is provided with the mounting portion along a certain direction and a pair of the outlet holders which can be mounted at a predetermined position on the mounting portion of the base wherein the electrical outlet is held between the outlet holders, an electrical outlet of variety of sizes can be easily dealt with as well as the position at which the electrical outlet is arranged can be easily changed to meet a demand of use. As a result, the outlet holder can mount an outlet of different sizes having a plurality of specifications or of each countries, which leads to a strong possibility that the outlet holder can be cooperate with the outlet which is likely to be varied more and more in future.

If both of the outlet holders have an elastically deformable face for clipping the outlet at the position facing each other, the outlet holder can hold the outlet by making use of elastic deformation of the outlet holder without causing damaged to the outlet.

If the outlet holder comprises a bracket and a resin member which is held by the bracket wherein a face for clipping the outlet is arranged at a part of the resin member, the outlet holder can obtain a certain strength in mounting if the bracket is made of, for example, metal having rigidity as well as the outlet holder can hold the outlet by making use of elastic deformation of the resin member without causing damaged to the outlet.

Further, if the face for clipping the outlet is a tapered face which pushes the outlet against the base, it is possible to mount the outlet securely on the base.

In addition to this arrangement, if the continuous mounting portion for mounting the outlet holder on an appropriate position is a rail groove of the base which is made to open continuously as well as the base side of the outlet holder makes an engagement with the rail groove, the rail groove can be formed with ease, for example, by means of extrusion and the condition in which the outlet holder is mounted can be made extremely satisfactory.

Further, if the outlet holder is mounted by means of both the liner member arranged at the base side of the outlet holder and the screw which helically connects the liner member after passing through the outlet holder, and the base end of the outlet holder is affixed to the outer face of the base, the liner member is affixed to the inner face of the base in the rail groove, with this condition kept the screw is helically connected with the liner member, a part of the base is held between the outlet holder and the liner member so as to fix the outlet holder, the outlet holder can be mounted or dismounted with ease and a position at which the outlet holder is mounted can be selected optionally.

If the liner member is so arranged that it can pass through the rail groove and can be rotated at a predetermined angle so as to make an abutting contact with two positions each falls on the inner faces of the upper and lower base respectively after passing over the rail groove, the liner member can be inserted into the rail groove with ease and can be fixed on a predetermined position without fail after inserted.

If the base is a constructing element of a furniture comprising a top plate and, especially, the constructing element of the furniture having a top plate is a frame which constitutes a top plate supporting member, the frame can be utilized both for supporting a top plate and for mounting an outlet holder as well as it is possible to preferably conceal the outlet holder from outside by means of the top plate.

The numeral 4000 in FIG. 31 shows a cutout for drawing a cable provided at the frond edge of the top plate, and so is in other drawings.

Figure 35:
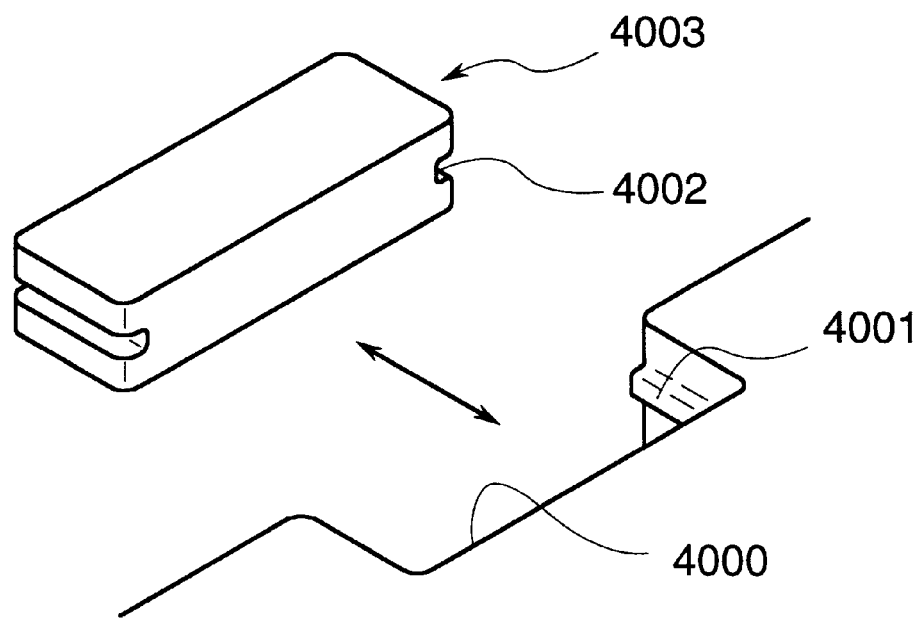
FIG. 35 is a modified view of the top plate.

Especially, a cutout 4000 shown in FIG. 35 has a shape of rectangular in plane view, which differs from a partial ark cutout shown in other drawings. And a cap 4003 can be slidably inserted into the cutout 4000 through a rail mechanism comprising a projection 4001 and a groove 4002. In accordance with this arrangement, the top plate can be made flat if the cap 4003 is mounted, whereas a space of the cutout for drawing a cable can be obtained sufficiently and utilized effectively for various optional components if the cap 4003 is dismounted.

POSSIBLE APPLICATIONS IN INDUSTRY

As mentioned above, the desk in accordance with the invention is ideally used as a desk in which a variety of top plates having different specifications can be supported by a common component element and the common component element can be utilized for mounting various kinds of optional components.

What is claimed is:

1. A desk comprising a top plate, having a top and an underside, leg support posts supporting the top plate, and a frame connecting upper ends of the leg support posts, the frame comprising a plurality of frame members arranged adjacent to the underside of the top plate, but with a space formed between the top plate and the frame, wherein at least a part of the frame members are provided with a longitudinally continuous mounting portion wherein a position on said mounting portion can be selected, and a mating mounting member can be held at said position for mounting a component; and wherein a part of the mounting member can be extended to a position near an edge of the top plate at which the component is mounted.

2. The desk of claim 1 wherein said mounting portion has a rail groove that is open continuously at an upright wall of said frame, and a base end of said mounting member can make an engagement with said rail groove.

3. The desk of claim 2 wherein said mounting member comprises a bracket having a mounting face, a liner member which is arranged at a base end of said bracket and a screw which is helically connected with said liner member passing through the bracket, wherein said mounting member can be fixed by steps of arranging the base end of the bracket affixed to an outer face of said upright wall, arranging said liner member affixed to an inner face of said upright wall in the rail groove, and helically connecting said screw which has passed through the bracket with the liner member so that the upright wall can be held between the bracket and the liner member.

4. The desk of claim 3 wherein said liner member can make an abutting contact with the inner faces by extending over the inner faces of the upright walls wherein the liner member is positioned by passing through an opening of the rail groove then rotating to a predetermined angle.

5. The desk of claim 4 wherein the frame comprises right and left side frame members, a front frame member connecting front ends of each side frame members and a reinforcing frame member connecting centers of each right and left side frame members, wherein at least the side frame members and the front frame member are made of a material extruded to have an isometric cross-section wherein a rail groove is made to open inwardly at an upright wall of the frame members.

6. The desk of claim 3 wherein the frame comprises right and left side frame members, a front frame member connecting front ends of each side frame members and a reinforcing frame member connecting centers of each right and left side frame members, wherein at least the side frame members and the front frame member are made of a material extruded to have an isometric cross-section wherein a rail groove is made to open inwardly at an upright wall of the frame members.

7. The desk of claim 2 wherein the frame comprises right and left side frame members, a front frame member connecting front ends of each side frame members and a reinforcing frame member connecting centers of each right and left side frame members, wherein at least the side frame members and the front frame member are made of a material extruded to have an isometric cross-section wherein a rail groove is made to open inwardly at an upright wall of the frame members.

8. The desk of claim 7 wherein the reinforcing frame member has rail grooves on both upright walls.

9. The desk of claim 8 wherein the reinforcing frame member is mounted on the side frame members by engaging each end of the reinforcing frame member with the corresponding rail groove of the side frame members.

10. The desk of claim 1 wherein the frame comprises right and left side frame members, a front frame member connecting front ends of each side frame members and a reinforcing frame member connecting centers of each right and left side frame members, wherein at least the side frame members and the front frame member are made of a material extruded to have an isometric cross-section wherein a rail groove is made to open inwardly at an upright wall of the frame members.

11. The desk of claim 1 wherein the frame comprises right and left side frame members, a front frame member connecting front ends of each side frame members and a reinforcing frame member connecting centers of each right and left side frame members, wherein at least the side frame members and the front frame member are made of a material extruded to have an isometric cross-section wherein a rail groove is made to open inwardly at an upright wall of the frame members.

* * * * *